(12) United States Patent
Kim et al.

(10) Patent No.: US 7,986,854 B2
(45) Date of Patent: Jul. 26, 2011

(54) METHOD AND APPARATUS FOR IMPROVING QUALITY OF COMPOSITE VIDEO SIGNAL AND METHOD AND APPARATUS FOR REMOVING ARTIFACT OF COMPOSITE VIDEO SIGNAL

(75) Inventors: Sung-hee Kim, Seoul (KR); Seung-Joon Yang, Seoul (KR); Rae-hong Park, Seoul (KR); Ji-won Lee, Seoul (KR); Hyun-seung Lee, Seoul (KR); Jun-young Kim, Seoul (KR); Bo-ra Lim, Seoul (KR)

(73) Assignees: Industry-University Cooperation Foundation Sogang University, Seoul (KR); Samsung Electronics Co., Ltd., Suwon-si (KR)

( * ) Notice: Subject to any disclaimer, the term of this patent is extended or adjusted under 35 U.S.C. 154(b) by 1079 days.

(21) Appl. No.: 11/761,219

(22) Filed: Jun. 11, 2007

(65) Prior Publication Data

US 2007/0286287 A1    Dec. 13, 2007

(30) Foreign Application Priority Data

Jun. 13, 2006    (KR) .................. 10-2006-0052873

(51) Int. Cl.
    *G06K 9/40*    (2006.01)
(52) U.S. Cl. ........ 382/275; 382/232; 382/240; 382/254; 382/260; 382/261; 348/645; 348/627; 348/708
(58) Field of Classification Search .................. None
    See application file for complete search history.

(56) References Cited

U.S. PATENT DOCUMENTS

| | | | |
|---|---|---|---|
| 6,028,646 A * | 2/2000 | Jeong et al. | 348/645 |
| 2006/0274210 A1* | 12/2006 | Kim | 348/624 |
| 2009/0175552 A1* | 7/2009 | Mallat | 382/254 |

OTHER PUBLICATIONS

Baraniuk et al, "Improvement Wavelet denoising via empirical Wiener filtering", Jul. 1997, Proceedings of SPIE, vol. 3169, pp. 389-399.*
Donoho, "De-noising by Soft-Thresholding", May 1995, IEEE Trans. Information Theory, vol. 41, No. 3, pp. 613-627.*
Krim et al., "On denoising and best signal representation", Nov. 1999, IEEE Trans. Information Theory, vol. 45, No. 7, pp. 2225-2238.*
Jang et al., "Locally adaptive Wiener filtering in wavelet domain for image restoration", Dec. 1997, in Proc. IEEE TENCON '87 Conf., pp. 25-28.*
Kaur et al. "Image Denoising using Wavelet Thresholding", 2002, Indian Conference on Computer Vision, Graphics and Image Processing.*

* cited by examiner

*Primary Examiner* — Sath V Perungavoor
*Assistant Examiner* — Jason Heidemann
(74) *Attorney, Agent, or Firm* — Sughrue Mion, PLLC

(57) ABSTRACT

A method of improving picture quality in a composite video burst signal includes dividing the composite video burst signal into a plurality of frequency bands using a low pass filter and a high pass filter, performing wavelet packet filtering of frequency bands including a chrominance signal having energy higher than a specified threshold among the plurality of frequency bands, and performing Wiener filtering of frequency bands including a chrominance signal having energy lower than a specified threshold.

15 Claims, 17 Drawing Sheets

FIG. 20

| $M_{map}$ | $MC_{map}$ | $DC_{map}(t)$ | $DC_{map}(t-1)$ | $RB_{map}$ | FILTER | REMARKS |
|---|---|---|---|---|---|---|
| 0 | x | x | x | x | | MOTIONLESS AREA |
| 1 | 0 | 1 | 1 | x | TIME FILTER | DOT CRAWL ARTIFACT (IN CASE OF IDENTICAL POSITIONS IN TWO FRAMES) |
| 1 | 0 | 0 | 0 | 1 | | RAINBOW EFFECT |
| 1 | x | 0 | 1 | x | SPACE FILTER | DOT CRAWL ARTIFACT (POSITIONED AT DIFFERENT LINES) |
| 1 | x | 1 | 0 | x | | |
| 1 | 1 | 1 | 1 | x | NOT USED | DOT CRAWL ARTIFACT (WHEN MOTION COMPENSATION IS NOT APPROPRIATE) |
| 1 | 1 | 0 | 0 | 1 | | RAINBOW EFFECT (WHEN MOTION COMPENSATION IS NOT APPROPRIATE) |
| 1 | x | 0 | 0 | 0 | | MOTION AREA WITH NO ARTIFACT |

METHOD AND APPARATUS FOR IMPROVING QUALITY OF COMPOSITE VIDEO SIGNAL AND METHOD AND APPARATUS FOR REMOVING ARTIFACT OF COMPOSITE VIDEO SIGNAL

CROSS-REFERENCE TO RELATED PATENT APPLICATIONS

This application claims priority to Korean Patent Application No. 10-2006-0052873, filed on Jun. 13, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to improving picture quality in a composite video burst signal, and removing artifacts in a composite video burst signal.

2. Description of the Related Art

In a process of encoding video information in a National Television System Committee (NTSC) system, a signal is encoded such that a luminance signal is modulated onto the low frequency part of the signal, and a chrominance signal is modulated onto the high frequency part of the signal. This signal is called a composite video burst signal (CVBS), and through a transmission and reception process, white Gaussian noise (WGN) is added to this signal. When the noise is thus added to the composite video burst signal, both the luminance and chrominance signals are affected. Accordingly, noise having a variety of colors as well as noise having black and white colors appears, and the picture quality deteriorates. In order to reduce degradation of the picture quality, much research has been carried out.

FIG. 1 is a block diagram illustrating a related art apparatus for improving picture quality.

Referring to FIG. 1, in the related art apparatus for improving picture quality, if a composite video burst signal $X_{CVBS}$ is input to a decoder 102, the decoder 102 separates the composite video burst signal $X_{CVBS}$ into a luminance signal and a chrominance signal. The decoder 102 extends the one-dimensional (1D) signal to a two-dimensional (2D) or three-dimensional (3D) signal by applying a line delay and a frame delay, and filters the signal through a filter included in the decoder 102. An artifact detection and removal unit 104 performs filtering of the signal $X_{RGB}$ decoded by the decoder 102, and outputs an artifact-free signal $X'_{RGB}$.

In the related art apparatus for improving picture quality described above, it is assumed that the noise in the video signal $X_{RGB}$ after the decoding is white Gaussian noise. Furthermore, it is assumed that the noise is in a luminance signal, which has the most information in the video signal, and thus removal of noise is performed in relation to only the luminance signal. However, in the case of actual noise occurring in the process of transmitting and receiving a television signal, noise is added in the process of transforming signals into a composite video burst signal, and thus, noise having a color component is generated in addition to the luminance signal noise.

Accordingly, after a composite video burst signal including noise is decoded, if noise in a video signal $X_{RGB}$ is analyzed, it can be seen that the noise is composed of dots having black-and-white components and a variety of colors. Also, it can be seen that the pattern of the noise in the composite video burst signal is different from that of 2D white Gaussian noise, which is used in the related art apparatus. The characteristic of the white Gaussian noise changes according to a decoder used in the process of decoding, and thus, the noise becomes a color noise form on a video plane.

The related art apparatus for improving picture quality cannot apply an appropriate algorithm to this noise, and thus, the improvement of picture quality by the related art apparatus is not effective.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for improving picture quality in a composite video burst signal, and a method and apparatus for removing artifacts in a composite video burst signal, in which a filter is disposed before decoding is performed, and through preprocessing, noise in a 1-dimensional signal is removed and by using a variety of artifact detection and removal methods, picture quality is improved.

According to an aspect of the present invention, there is provided a method of improving picture quality in a composite video burst signal including dividing the composite video burst signal into a plurality of frequency bands by using a low pass filter and a high pass filter, performing wavelet packet filtering of bands including a chrominance signal higher than a specified threshold among the divided plurality of frequency bands, and performing Wiener filtering of bands including a chrominance signal lower than a specified threshold.

The performing of the wavelet packet filtering may include dividing the composite video burst signal further into a plurality of bands, generating wavelet transform coefficients by applying wavelet transforms to the plurality of further divided band signals, and removing a signal in a frequency band having a generated wavelet transform coefficient whose absolute value is less than a specified threshold.

In the performing of the Wiener filtering, the size of a mask may be varied with respect to the magnitude of a noise ratio.

The method may further include separating the filtered composite video burst signal into a luminance signal and a chrominance signal, separating the chrominance signal into an in-phase signal and an orthogonal-phase signal, and transforming the luminance signal, the in-phase signal and the orthogonal-phase signal into an R signal, a G signal, and a B signal, respectively, in RGB space, and outputting an output video signal.

The method may further include detecting and removing an artifact of the output video signal, wherein the detecting and removing of the artifact includes encoding the output video signal and outputting a predicted value of a composite video burst signal, and filtering the output predicted value of the composite video burst signal by using a YC separation filter of a type different from that of a YC separation filter for separating a luminance signal and a chrominance signal in a system decoder.

The method may further include detecting and removing an artifact of the output video signal, wherein the detecting and removing the artifact includes transforming the output video signal into a luminance signal, an in-phase signal and an orthogonal-phase signal, synthesizing the in-phase signal and the orthogonal signal into a chrominance signal, synthesizing the luminance signal and the synthesized chrominance signal into a composite video burst signal, generating an artifact detection map indicating an area where an artifact occurs, by comparing the luminance signal and a signal obtained by low pass filtering the composite video burst signal, and filtering the area where the artifact is detected according to the artifact detection map by using a YC separation filter of a type different from that of a YC separation filter for separating a luminance signal and a chrominance signal in a system decoder.

The method may further include detecting and removing an artifact of the output video signal, wherein the detecting and removing the artifact includes estimates a motion vector from two neighboring frames in the output video signal, generates a motion detection map indicating whether motion exists between two neighboring frames and a motion compensation map indicating whether a motion compensation filter is used based on the motion vector, detecting a dot crawl artifact that is a dot crawl occurring in the vicinity of an outline of an image and generating a dot crawl artifact map, or detecting a rainbow effect in which rainbow colors are seen in an area where a big difference of brightness occurs when an image moves fast, and generating a rainbow effect detection map, compensating for a motion according to the motion compensation map, and filtering the area where the artifact occurs by combining a time filter and a space filter based on control signals of the motion detection map, the motion compensation map, the dot crawl artifact detection map in a current frame, the dot crawl artifact detection map in the previous frame, and the rainbow effect detection map.

According to another aspect of the present invention, there is provided a method of detecting and removing an artifact in a composite video burst signal, including encoding an output video signal and outputting a predicted value of a composite video burst signal, and filtering the output predicted value of the composite video burst signal by using a YC separation filter of a type different from that of a YC separation filter for separating a luminance signal and a chrominance signal in a system decoder.

According to another aspect of the present invention, there is provided a method of detecting and removing an artifact in a composite video burst signal, including transforming an output video signal into a luminance signal, an in-phase signal and an orthogonal-phase signal, synthesizing the in-phase signal and the orthogonal signal into a chrominance signal, synthesizing the luminance signal and the synthesized chrominance signal into a composite video burst signal, generating an artifact detection map indicating an area where an artifact occurs, by comparing the luminance signal and a signal obtained by low pass filtering the composite video burst signal, and filtering the area where the artifact is detected according to the artifact detection map, by using a YC separation filter of a type different from that of a YC separation filter for separating a luminance signal and a chrominance signal in a system decoder.

According to another aspect of the present invention, there is provided method of detecting and removing an artifact in a composite video burst signal, including estimates a motion vector from two neighboring frames in the output video signal, generates a motion detection map indicating whether motion exists between two neighboring frames and a motion compensation map indicating whether a motion compensation filter is used based on the motion vector, detecting an artifact in which by detecting a dot crawl artifact that is a dot crawl occurring in the vicinity of an outline of an image, a dot crawl artifact map is generated, or by detecting a rainbow effect in which rainbow colors are seen in an area where a big difference of brightness occurs when an image moves fast, a rainbow effect detection map is generated, compensating for a motion according to the motion compensation map, and filtering the area where the artifact occurs, by combining a time filter and a space filter based on control signals of the motion detection map, the motion compensation map, the dot crawl artifact detection map in a current frame, the dot crawl artifact detection map in the previous frame, and the rainbow effect detection map.

According to another aspect of the present invention, there is provided an apparatus for improving picture quality in a composite video burst signal including a preprocessing filter performing filtering of the composite video burst signal by using a wavelet packet filter and a Wiener filter, a YC separation unit separating the filtered composite video burst signal into a luminance signal and a chrominance signal, a color demodulation unit separating the chrominance signal into an in-phase signal and an orthogonal-phase signal, and a YIQ-RGB color space transform unit transforming the filtered luminance signal, in-phase signal and orthogonal-phase signal into an R signal, a G signal, and a B signal, respectively, in RGB space, and outputting an output video signal.

The apparatus may further include an artifact detection and removal unit detecting which removes an artifact of the output video signal, wherein the artifact detection and removal unit includes an encoder prediction unit encoding the output video signal and outputting a predicted value of a composite video burst signal, and a decoder prediction unit decoding the output predicted value of the composite video burst signal and outputting a predicted value of an input video signal.

The decoder prediction unit may include a YC separation unit performing filtering to separate the predicted value of the composite video burst signal into an in-phase signal and an orthogonal-phase signal by using a YC separation filter of a type different from that of a YC separation filter for separating a luminance signal and a chrominance signal in a system decoder, a color demodulation unit separating the chrominance signal into an in-phase signal and an orthogonal-phase signal, and a YIQ-RGB color space transform unit transforming the luminance signal, the in-phase signal and the orthogonal-phase signal into an R signal, a G signal, and a B signal, respectively, in RGB space and thus into a predicted value of the input video signal.

The apparatus may further include an artifact detection and removal unit detecting and removing an artifact of the output video signal, wherein the artifact detection and removal unit includes an RGB-YIQ color space transform unit transforming the output video signal into a luminance signal, an in-phase signal and an orthogonal-phase signal, a color modulation unit synthesizing the in-phase signal and the orthogonal signal into a chrominance signal, a YC addition unit synthesizing the luminance signal and the synthesized chrominance signal into a composite video burst signal, an artifact detection map generation unit generating an artifact detection map indicating an area where an artifact occurs by comparing the luminance signal and a signal obtained by low pass filtering the composite video burst signal, and an artifact removal unit removing artifacts by decoding the composite video burst signal according to the artifact detection map.

The artifact removal unit may include a YC separation unit performing filtering to separate the area where the artifact is detected according to the artifact detection map, into a luminance signal and a chrominance signal by using a YC separation filter of a type different from that of a YC separation filter for separating a luminance signal and a chrominance signal in a system decoder, a color demodulation unit separating the chrominance signal into an in-phase signal and an orthogonal-phase signal, and a YIQ-RGB color space transform unit transforming the luminance signal, the in-phase signal and the orthogonal-phase signal into an R signal, a G signal, and a B signal, respectively, in RGB space, and outputting an artifact-free signal.

The apparatus may further include an artifact detection and removal unit detecting and removing an artifact of the output video signal, wherein the artifact detection and removal unit includes a motion area detection unit which estimates a motion vector from two neighboring frames in the output video signal, generates a motion detection map indicating whether motion exists between two neighboring frames and a motion compensation map indicating whether a motion compensation filter is used based on the motion vector, an artifact detection unit generating a dot crawl artifact map by detecting a dot crawl artifact that is a dot crawl occurring in the vicinity of an outline of an image, or generating a rainbow effect detection map by detecting a rainbow effect in which rainbow colors are seen in an area where a big difference of brightness occurs when an image moves fast, a motion compensation unit compensating for a motion according to the motion compensation map, and a multiplexing unit filtering the area where the artifact occurs by combining a time filter and a space filter based on control signals of the motion detection map, the motion compensation map, the dot crawl artifact detection map in a current frame, the dot crawl artifact detection map in the previous frame, and the rainbow effect detection map.

According to another aspect of the present invention, there is provided an apparatus for detecting and removing an artifact in a composite video burst signal, including an encoder prediction unit encoding an output video signal and outputting a predicted value of a composite video burst signal, and a decoder prediction unit decoding the output predicted value of the composite video burst signal and outputting a predicted value of an input video signal.

The decoder prediction unit may include a YC separation unit performing filtering to separate the predicted value of the composite video burst signal into a luminance signal, an in-phase signal and an orthogonal-phase signal by using a YC separation filter of a type different from that of a YC separation filter for separating a luminance signal and a chrominance signal in a system decoder, a color demodulation unit separating the chrominance signal into an in-phase signal and an orthogonal-phase signal, and a YIQ-RGB color space transform unit transforming the luminance signal, the in-phase signal and the orthogonal-phase signal into an R signal, a G signal, and a B signal, respectively, in RGB space and thus into a predicted value of the input video signal.

According to another aspect of the present invention, there is provided an apparatus for detecting and removing an artifact in a composite video burst signal including an RGB-YIQ color space transform unit transforming an output video signal into a luminance signal, an in-phase signal and an orthogonal-phase signal, a color modulation unit synthesizing the in-phase signal and the orthogonal signal into a chrominance signal, a YC addition unit synthesizing the luminance signal and the synthesized chrominance signal into a composite video burst signal, an artifact detection map generation unit generating an artifact detection map indicating an area where an artifact occurs by comparing the luminance signal and a signal obtained by low pass filtering the composite video burst signal, and an artifact removal unit removing artifacts by decoding the composite video burst signal according to the artifact detection map.

The artifact removal unit may include a YC separation unit performing filtering to separate the area where the artifact is detected according to the artifact detection map into a luminance signal and a chrominance signal by using a YC separation filter of a type different from that of a YC separation filter for separating a luminance signal and a chrominance signal in a system decoder, a color demodulation unit separating the chrominance signal into an in-phase signal and an orthogonal-phase signal, and a YIQ-RGB color space transform unit transforming the luminance signal, the in-phase signal and the orthogonal-phase signal into an R signal, a G signal, and a B signal, respectively, in RGB space, and outputting an artifact-free signal.

According to another aspect of the present invention, there is provided an apparatus for detecting and removing an artifact in a composite video burst signal including a motion area detection which estimates a motion vector from two neighboring frames in the output video signal, generates a motion detection map indicating whether motion exists between two neighboring frames and a motion compensation map indicating whether a motion compensation filter is used based on the motion vector, an artifact detection unit generating a dot crawl artifact map by detecting a dot crawl artifact that is a dot crawl occurring in the vicinity of an outline of an image, or generating a rainbow effect detection map by detecting a rainbow effect in which rainbow colors are seen in an area where a big difference of brightness occurs when an image moves fast, a motion compensation unit compensating for a motion according to the motion compensation map, and a multiplexing unit filtering the area where the artifact occurs by combining a time filter and a space filter based on control signals of the motion detection map, the motion compensation map, the dot crawl artifact detection map in a current frame, the dot crawl artifact detection map in the previous frame, and the rainbow effect detection map.

The motion area detection unit may estimate a motion by using the difference between brightness values of a current frame block and the previous frame block, and generate a motion detection map indicating the presence of a motion. A motion compensation unit may indicate whether a motion is compensated for.

The time filter may remove an artifact of the composite video burst signal by performing time filtering of an artifact in an area where no motion exists or by performing time filtering of an artifact in an area where a motion exists after compensating for a motion.

The space filter may perform space filtering using the following equation, or with a filter using a neural network circuit:

$$\hat{F}(x, y, ; t)_{spatial} = \frac{F(x-1, y; t) + F(x+1, y; t) + F(x, y-1; t) + F(x, y+1; t)}{4}.$$

BRIEF DESCRIPTION OF THE DRAWINGS

The above and other aspects of the present invention will become more apparent by describing in detail exemplary embodiments thereof with reference to the attached drawings in which:

FIG. 20 is a table illustrating the relations between control signals of the multiplexing unit and filters according to an exemplary embodiment of the present invention.

DETAILED DESCRIPTION OF THE EXEMPLARY EMBODIMENTS

The present invention will now be described more fully with reference to the accompanying drawings, in which exemplary embodiments of the invention are shown.

Figure 1:
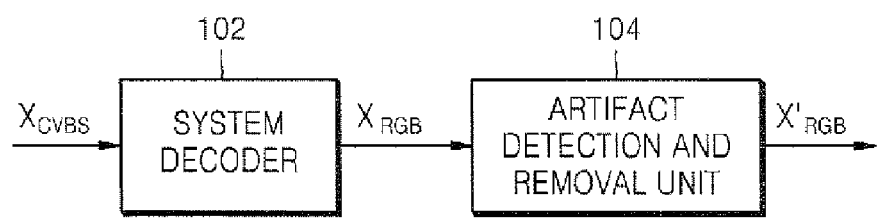
FIG. 1 is a block diagram illustrating a related art apparatus for improving picture quality.
Figure 2:
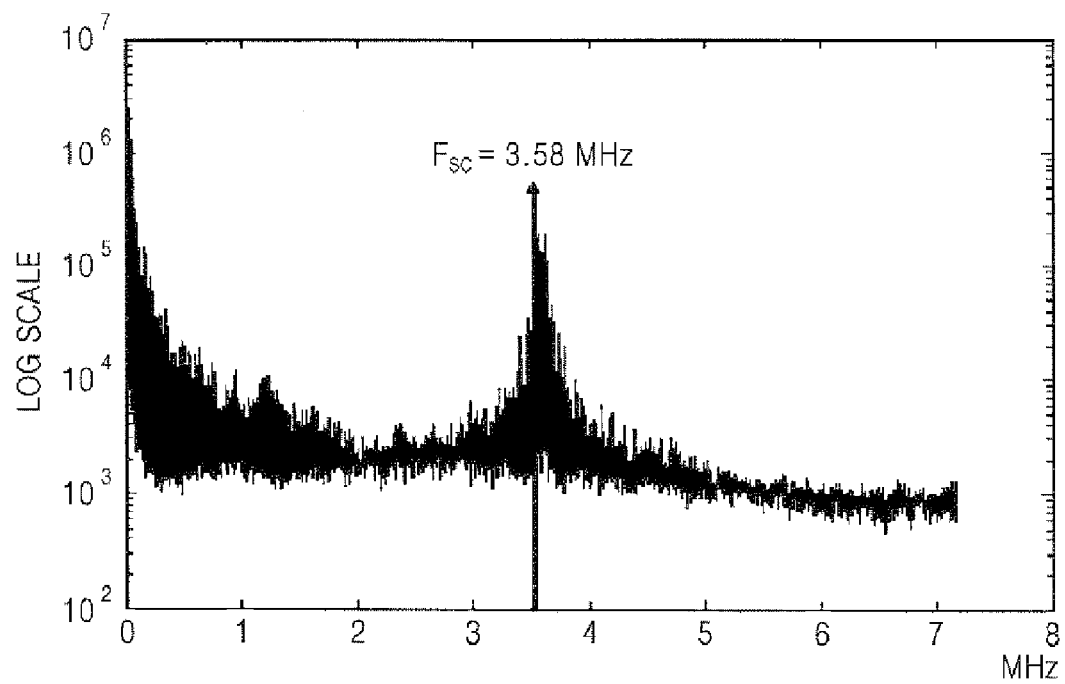
FIG. 2 is a graph illustrating the frequency characteristic of a composite video burst signal.

As illustrated in FIG. 2, a composite video burst signal includes an in-phase signal (I signal) and an orthogonal-phase signal (Q signal) with a color subcarrier frequency Fsc (3.58 Mhz) at the center. Accordingly, the composite video burst signal has a form in which a luminance signal, an in-phase signal and an orthogonal-phase signal are added as shown in equation 1 below. The luminance signal (Y signal) is positioned in low frequency bands and the chrominance signal (C signal) is positioned in high frequency bands:

$$CVBS = Y + C = Y + I\cos(F_{sc}t) + Q\sin(F_{sc}t) \quad (1)$$

Thus, the composite video burst signal has much information in the low frequency bands but also has much information around 3.58 Mhz where the chrominance signal is positioned. Accordingly, the ordinary noise removal technique by which a high frequency band is removed or energy is reduced in an ordinary signal processing process may damage the chrominance signal.

Figure 3:
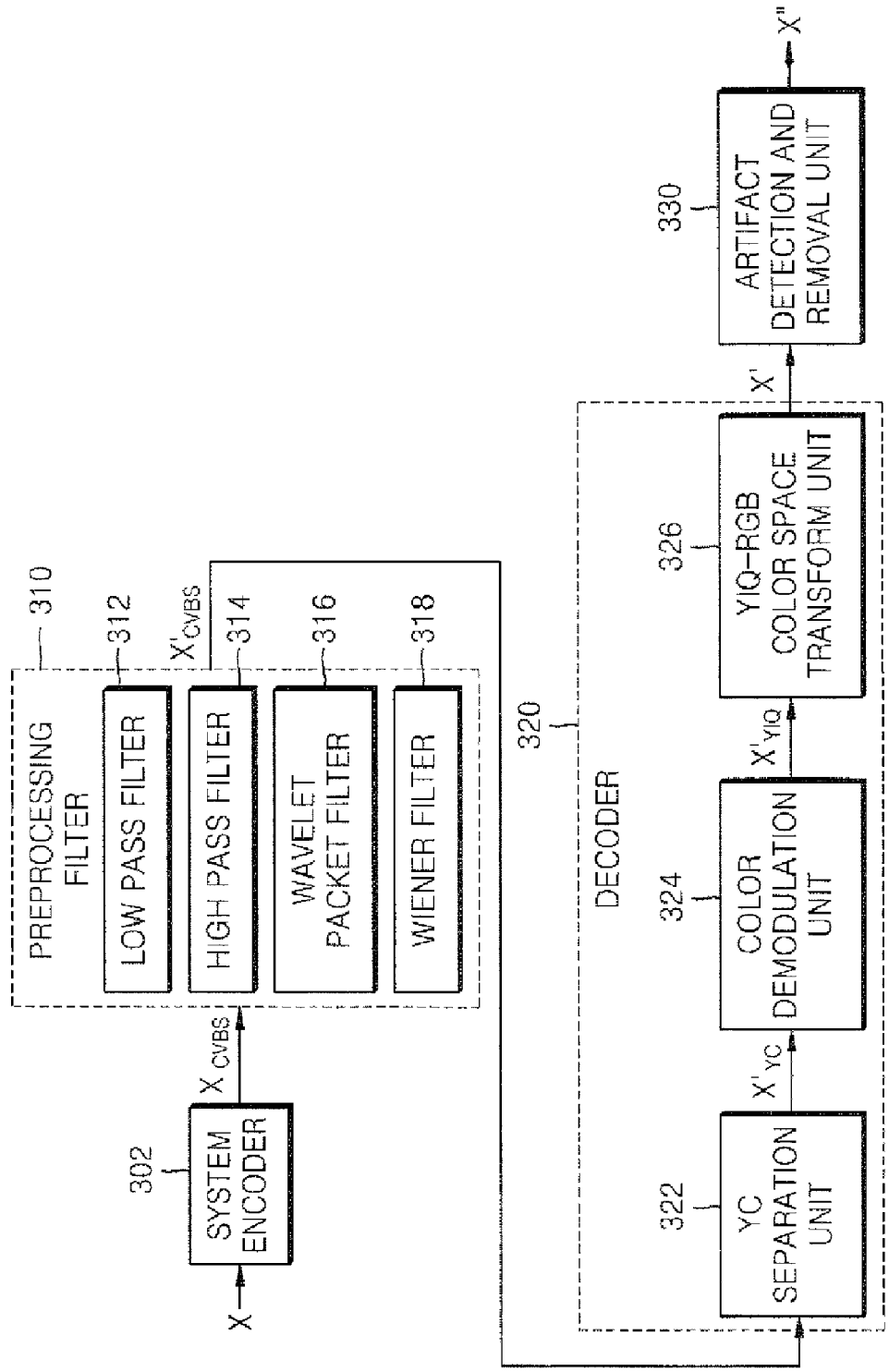
FIG. 3 is a block diagram illustrating a structure of an apparatus for improving picture quality according to an exemplary embodiment of the present invention.

FIG. 3 is a block diagram illustrating a structure of an apparatus for improving picture quality according to an exemplary embodiment of the present invention. Referring to FIG. 3, the apparatus for improving picture quality is composed of a preprocessing filter 310, a decoder 320, and an artifact detection and removal unit 330. For convenience of explanation, a system encoder 302 is also shown.

If an input video signal X is input, the system encoder 302 encodes the input video signal X and outputs a composite video burst signal $X_{CVBS}$.

The preprocessing filter 310 is composed of a low pass filter 312, a high pass filter 314, a wavelet packet filter 316, and a Wiener filter 318.

The low pass filter 312 and the high pass filter 314 divide the composite video burst signal $X_{CVBS}$ into a plurality of frequency bands.

The wavelet packet filter 316 further divides each band having a chrominance signal energy equal to or higher than a specified threshold into smaller bands, and among the further divided bands, the wavelet packet filter 316 removes a signal in each band having energy lower than a specified threshold.

The Wiener filter 318 performs Wiener filtering of each band having a chrominance signal energy lower than a specified threshold and thus removes noise.

The operations of the preprocessing filter 310 will be explained later in more detail with reference to FIGS. 5 and 6.

The decoder 320 is composed of a YC separation unit 322, a color demodulation unit 324, and a YIQ-RGB color space transform unit 326.

The YC separation unit 322 separates the filtered composite video burst signal $X'_{CVBS}$ into a luminance signal and a chrominance signal.

The color demodulation unit 324 separates the chrominance signal into an in-phase signal and an orthogonal-phase signal.

The YIQ-RGB color space transform unit 326 transforms the luminance signal, the in-phase signal and the orthogonal-phase signal into an R signal, a G signal and a B signal, respectively, and outputs an output video signal.

The artifact detection and removal unit 330 detects an artifact of the output video signal X', removes the detected artifact, and outputs an artifact-free signal, X". The process of detecting and removing the artifact will be explained later with reference to FIGS. 7 through 20.

Figure 4:
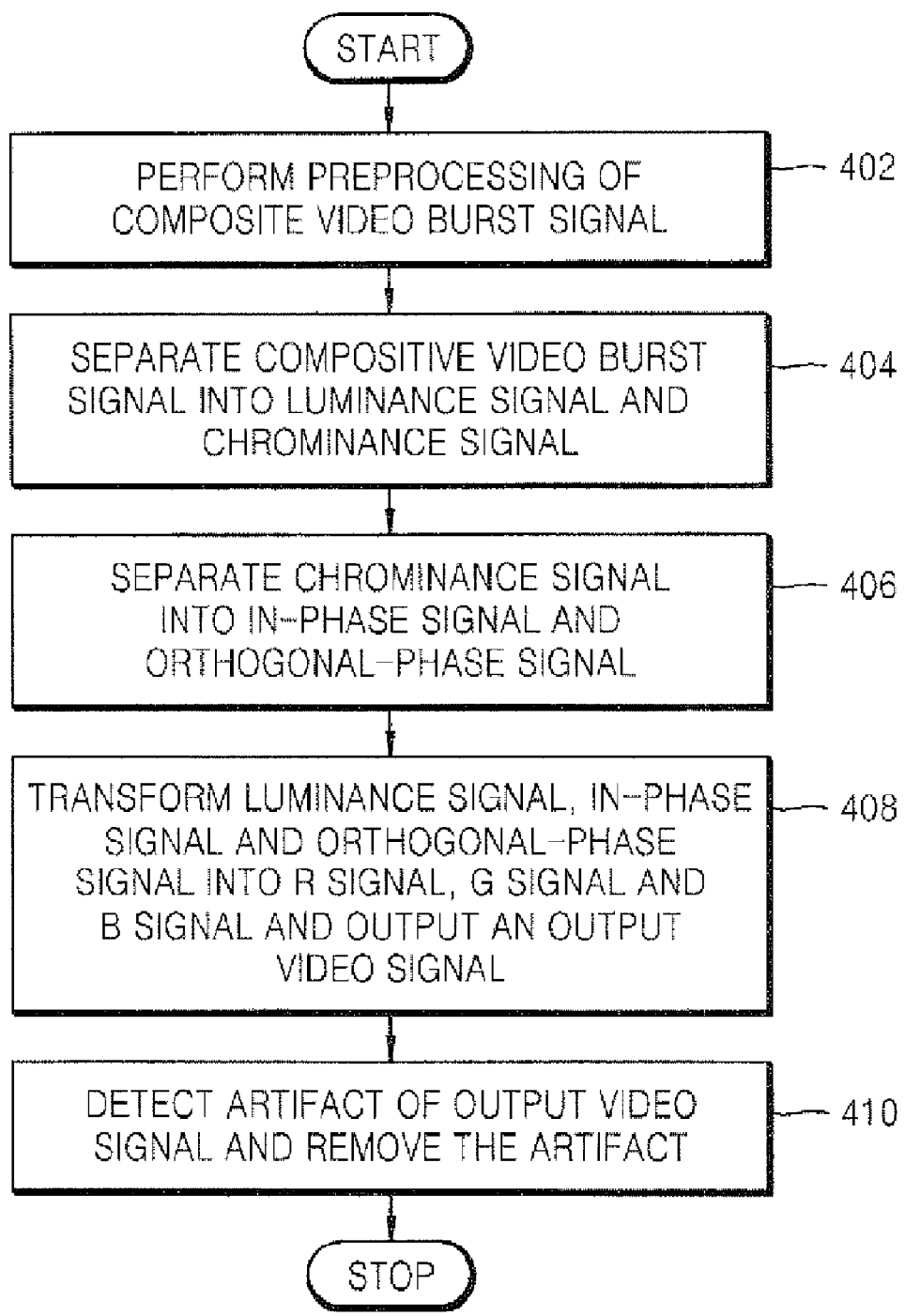
FIG. 4 is a flowchart illustrating a method of improving picture quality according to an exemplary embodiment of the present invention.

FIG. 4 is a flowchart illustrating a method of improving picture quality according to an exemplary embodiment of the present invention. Referring to FIG. 4, the method of improving picture quality will now be explained.

In operation 402, if the input video signal X is encoded into a composite video burst signal $X_{CVBS}$ and transmitted, preprocessing of the composite video burst signal $X_{CVBS}$ is performed. The preprocessing will be explained later with reference to FIGS. 5 and 6.

In operation 404, the composite video burst signal $X_{CVBS}$ is separated into a luminance signal and a chrominance signal.

In operation 406, the chrominance signal is separated into an in-phase signal and an orthogonal phase signal.

In operation 408, the luminance signal, the in-phase signal and the orthogonal-phase signal are transformed into an R signal, a G signal and a B signal, respectively, on an RGB plane and an output video signal X' is output.

In operation 410, an artifact of the output video signal X' is detected and removed. The method of detecting and removing an artifact can be performed in a variety of ways, which will be explained later with reference to FIGS. 7 through 20.

Figure 5:
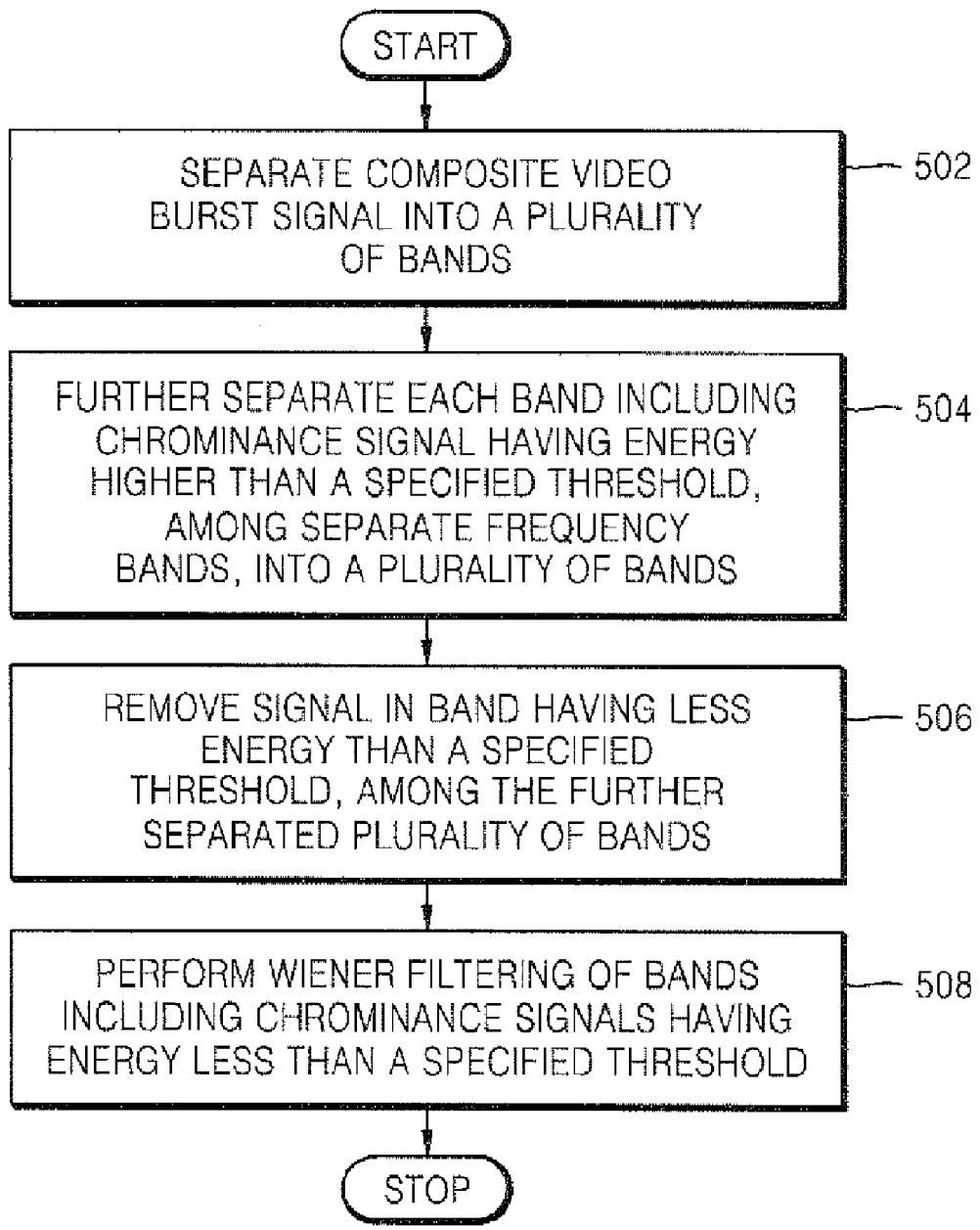
FIG. 5 is a flowchart illustrating preprocessing according to an exemplary embodiment of the present invention.

FIG. 5 is a flowchart illustrating preprocessing according to an exemplary embodiment of the present invention.

In operation 502, the composite video burst signal $X_{CVBS}$ is separated into a plurality of bands.

Figure 6:
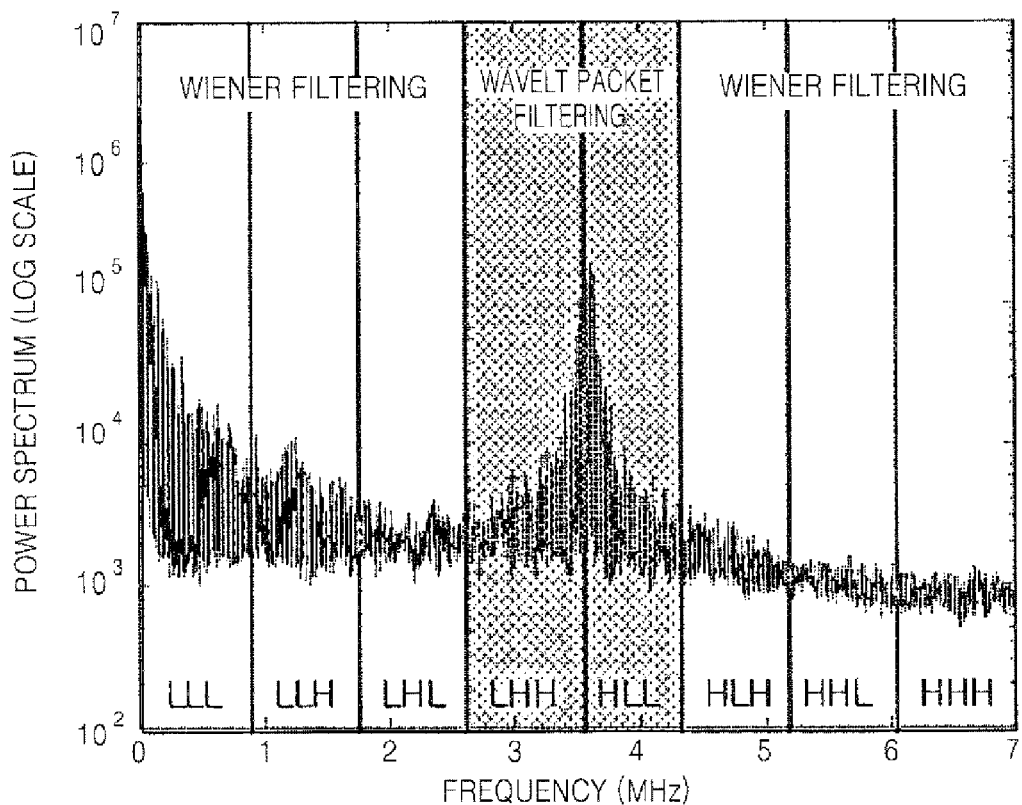
FIG. 6 is a graph illustrating a process of a preprocessing filter according to an exemplary embodiment of the present invention.

FIG. 6 is a graph illustrating a process of a preprocessing filter according to an exemplary embodiment of the present invention. Referring to FIG. 6, the process of separating the composite video burst signal $X_{CVBS}$ into a plurality of bands will now be explained.

First, the composite video burst signal $X_{CVBS}$ is filtered through a low pass filter and a high pass filter.

As a result of the filtering, the signal $X_{CVBS}$ is separated into a high frequency band including LLL, LLH, LHL, and LHH bands, and a low frequency band including HLL, HLH, HHL, and HHH bands.

If the frequency bands are again separated using a low pass filter and a high pass filter, the low frequency band is separated into a band including LLL and LLH bands and a band including LHL and LHH bands, and the high frequency band is separated into a band including HHL and HHH bands and a band including HLL and HLH bands.

Finally, the frequency bands are again separated using a low pass filter and a high pass filter, and eight separated bands, including LLL, LLH, LHL, LHH, HLL, HLH, HHL, and HHH bands, are obtained.

In operation 504, among the separated frequency bands, each band having a chrominance signal energy equal to or higher than a specified threshold is further divided into a plurality of bands.

Referring to FIG. 6, LHL and HLL bands are bands that have a chrominance signal energy equal to or higher than a specified threshold, and these bands are once more separated into four or more bands. Here, the bands having a chrominance signal energy equal to or higher than the specified threshold are generally distributed in the vicinity of 3.58 MHz, which is an eigenfrequency of a chrominance signal that is from about 2.5 MHz to 5 MHz. However, the threshold may be applied differently in other exemplary embodiments.

In operation 506, among the further divided plurality of bands, a signal in each band having energy less than a specified threshold is removed.

In order to perform the removal function, a best basis algorithm is used in the current exemplary embodiment of the present invention.

In the best basis algorithm, it is assumed that a wavelet transform is $B=\{W_p\}_{1 \leq p \leq N}$, and when a wavelet transform coefficient is $<x, W_p>$, only a signal satisfying equation 2 below is restored using B, with respect to a threshold T corresponding to a purpose such as compression or noise removal. Here, restoration means that a signal of a band having a size less than the threshold T is removed by setting the size to 0, and only the remaining signals are used.

$$|<x,W_p>|>T \qquad (2)$$

That is, by applying the wavelet transform $B=\{W_p\}_{1 \leq p \leq N}$ to each of the signals of the plurality of separated bands, wavelet coefficients $<x, W_p>$ are generated, and in relation to the signal of a frequency band having a generated wavelet coefficient whose absolute value is less than the specified threshold, the size of the signal is set to 0 and thus is removed. These signals are removed since the composite video burst signal $X_{CVBS}$ is a signal before decoding is performed and a signal in which noise, such as white Gaussian noise, has been added to all bands. Accordingly, a frequency band having less energy is thought to indicate that when the signal of the frequency band is decoded, noise has more influence than the signal.

Further, T varies with respect to the purpose of using the wavelet packet. In the case of compression, T is set to have a small value to minimize damage to information. In the case of noise removal, a value greater than that in the case of compression is used considering the distribution and the characteristic of the signal. However, a different value may be employed as the threshold in other exemplary embodiments.

In operation 508, Wiener filtering of the bands having a chrominance signal energy lower than the specified threshold is performed.

Referring to FIG. 6, Wiener filtering is performed with respect to LLL, LLH, LHL, HLH, HHL, and HHH bands, excluding LHH and HLL bands.

Assuming that a signal from which noise should be removed is g, a local mean is $$m_g = \frac{1}{(2W+1)} \sum_{i=-n}^{i=n} g(i),$$

and a noise-removed signal is $\hat{f}$, the Wiener filtering is defined in equation 3 below:

$$\hat{f}(i) = m_g, \frac{\sigma^2 - v^2}{\sigma^2}(g(i) - m_g) \qquad (3)$$

where i is the size of a mask. Also, v of equation 3 represents noise dispersion, and is the dispersion of a signal obtained by subtracting the local mean mg from a signal g in which noise is included. By using equation 3, noise can be removed while protecting an edge component. The degree of protection of the edge component and the degree of noise removal can be adjusted by changing the size of the mask.

Referring to FIG. 6, a large amount of video information is modulated onto LLL and LLH bands, and in each band a signal component is much larger than noise. Accordingly, in order to remove noise while protecting signals in the bands as much as possible, the size of a mask is reduced. For example, the size of the mask can be set to 9 pixels. In this case, the range of i in the local mean $$m_g = \frac{1}{(2W+1)} \sum_{i=-n}^{i=n} g(i)$$

will be determined to be from −4 to 4.

LHL and HLH bands are in the vicinity of an eigenfrequency at which the chrominance signal is modulated, and have the high frequency component of the video signal. However, since the ratio of noise in LHL and HLH bands is higher than that in LLL and LLH bands, in order to increase the effect of noise removal the size of a mask is set to be bigger than that for LLL and LLH bands. For example, the size of the mask can be determined to be 49 pixels.

HHL and HHH bands take up the smallest portion of the entire composite video burst signal, while noise in HHL and HHH bands takes up a greater portion compared to the signal components. Accordingly, the size of a mask is set to be largest in the HHL and HHH bands. For example, the size of the mask can be determined to be about 79 pixels.

After filtering is performed with varying sizes of masks with respect to respective bands, the filtered bands are combined into one signal. In this way, noise can be removed while protecting signal components as much as possible. In this process, the smaller the size of the mask, the more the edge components can be protected, and the bigger the size of the mask, the more noise can be removed.

However, the size of the mask is not limited to the values described above and different values may be applied with respect to different exemplary embodiments.

Thus far in the process according to the exemplary embodiments of the present invention as described above, preprocessing of the composite video burst signal $X_{CVBS}$ is performed using the wavelet packet filter and Wiener filter, and by decoding the preprocessed signal $X'_{CVBS}$, the output video signal $X''$ from which noise has been removed is output.

A process of further removing artifacts in the output video signal $X''$ will now be explained.

Figure 7:
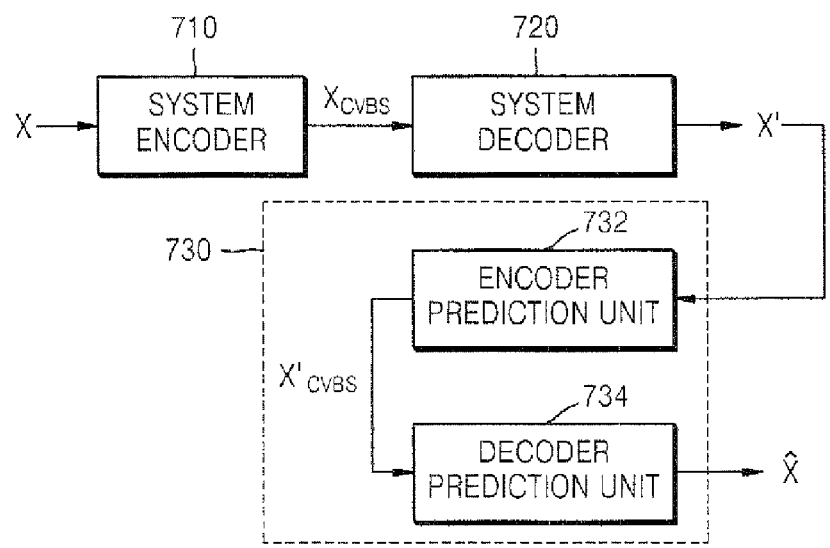
FIG. 7 is a block diagram illustrating a structure of an apparatus for detecting and removing artifacts according to an exemplary embodiment of the present invention.

FIG. 7 is a block diagram illustrating a structure of an apparatus for detecting and removing artifacts according to an exemplary embodiment of the present invention. Referring to FIG. 7, the apparatus for detecting and removing artifacts is composed of an encoder prediction unit 732 and a decoder prediction unit 734. A system encoder 710 and a system decoder 720 are illustrated to explain the current exemplary embodiment. Also, the apparatus for detecting and removing artifacts according to the current exemplary embodiment can be applied to the artifact detection and removal unit 330 of FIG. 3.

Figure 8A:
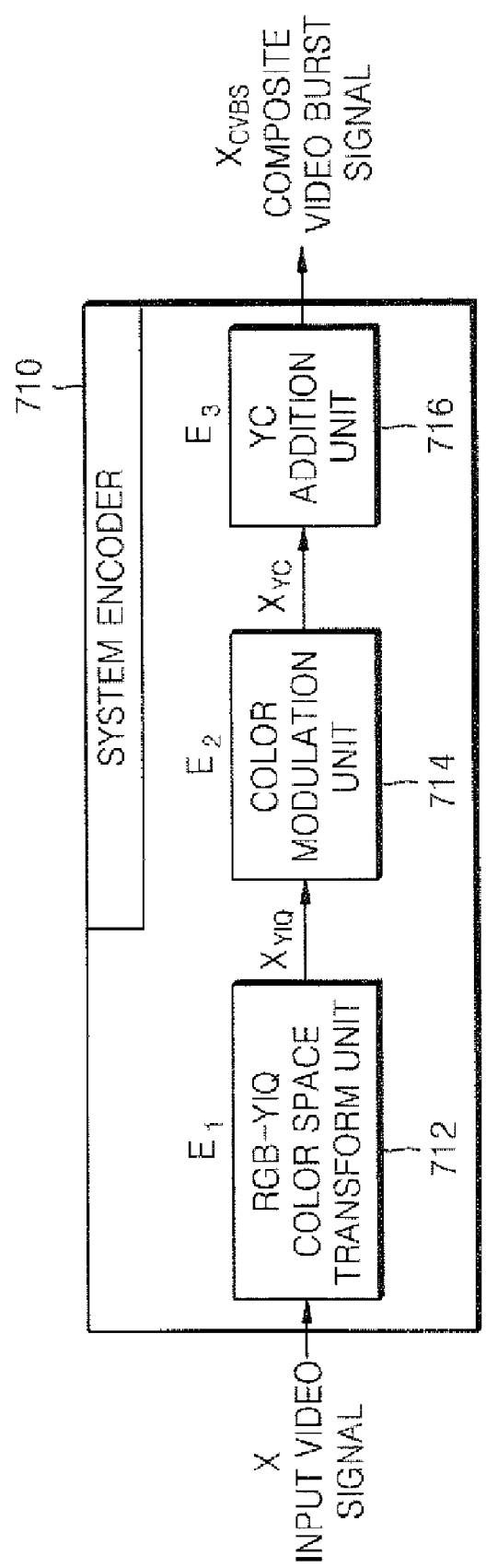
FIG. 8A is a block diagram illustrating a structure of an encoder according to an exemplary embodiment of the present invention.

FIG. 8A is a block diagram illustrating a structure of an encoder according to an exemplary embodiment of the present invention. Referring to FIG. 8A, system encoder 710 is composed of an RGB-YIQ color space transform unit 712, a color modulation unit 714, and a YC addition unit 716.

The RGB-YIQ color space transform unit ($E_1$) 712 transforms an RGB signal into a YIQ signal and the transform process is defined in equation 4 below:

$$x_{YIQ} = E_1 x, \quad (4)$$

$E_1$:[RGB to YIQ color space conversion]

$$\begin{bmatrix} Y_0 \\ I_0 \\ Q_0 \\ \vdots \\ Y_{MN-1} \\ I_{MN-1} \\ Q_{MN-1} \end{bmatrix} = \begin{bmatrix} E_1^{sub} & O_{3\times3} & \cdots & O_{3\times3} \\ O_{3\times3} & \ddots & & \vdots \\ \vdots & & \ddots & O_{3\times3} \\ O_{3\times3} & \cdots & O_{3\times3} & E_1^{sub} \end{bmatrix} \begin{bmatrix} R_0 \\ G_0 \\ B_0 \\ \vdots \\ R_{MN-1} \\ G_{MN-1} \\ B_{MN-1} \end{bmatrix}$$

where $Q_{max}$ is an m×n zero matrix and a submatrix $E_1^{sub}$ is defined in equation 5 below:

$$E_1^{sub} = \begin{bmatrix} 0.299 & 0.587 & 0.114 \\ 0.596 & -0.275 & -0.321 \\ 0.212 & -0.523 & 0.311 \end{bmatrix}, \quad E_1^{sub}: 3\times3 \quad (5)$$

The color modulation unit ($E_2$) performs a quadrature amplitude modulation (QAM) function for generating a chrominance signal by combining an in-phase signal and an orthogonal-phase signal. The modulation process is defined in equation 6 below:

$$x_{YC} = E_2 x_{YIQ},$$

$E_2$:[color modulation]

$$\begin{bmatrix} Y_0 \\ C_0 \\ \vdots \\ Y_{MN-1} \\ C_{MN-1} \end{bmatrix} = \begin{bmatrix} E_2^{sub} & O_{4M\times6M} & \cdots & O_{4M\times6M} \\ O_{4M\times6M} & \ddots & & \vdots \\ \vdots & & \ddots & O_{2M\times3M} \\ O_{4M\times6M} & \cdots & O_{4M\times6M} & E_2^{sub} \end{bmatrix} \begin{bmatrix} Y_0 \\ I_0 \\ Q_0 \\ \vdots \\ Y_{MN-1} \\ I_{MN-1} \\ Q_{MN-1} \end{bmatrix}$$

where the submatrix $E_2^{sub}$ is defined equation 7 below:

$$E_2^{sub} = \begin{bmatrix} E_2^{sub\_odd} & O_{2M\times3M} \\ O_{2M\times3M} & E_2^{sub\_even} \end{bmatrix}, \quad E_2^{sub}: 4M\times6M \quad (7)$$

Also, submatrices $E_2^{sub\_odd}$ and $E_2^{sub\_even}$ are defined in equations 8 and 9 below, respectively:

$$E_2^{sub\_odd} = \begin{bmatrix} E_2^{sub\_oddline} & O_{8\times12} & \cdots & O_{8\times12} \\ O_{8\times12} & \ddots & & \vdots \\ \vdots & & \ddots & O_{8\times12} \\ O_{8\times12} & \cdots & O_{8\times12} & E_2^{sub\_oddline} \end{bmatrix}, \quad E_2^{sub\_odd}: \quad (8)$$

$2M\times3M$, $$E_2^{sub\_even} = \begin{bmatrix} E_2^{sub\_evenline} & O_{8\times12} & \cdots & O_{8\times12} \\ O_{8\times12} & \ddots & & \vdots \\ \vdots & & \ddots & O_{8\times12} \\ O_{8\times12} & \cdots & O_{8\times12} & E_2^{sub\_evenline} \end{bmatrix}, \quad (9)$$

$E_2^{sub\_even}: 2M\times3M$

Also, submatrices $E_2^{sub\_oddline}$ and $E_2^{sub\_evenline}$ are defined in equations 10 and 11 below:

$$E_2^{sub\_oddline} = \begin{bmatrix} 1 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & -1 & 0 & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & -1 \end{bmatrix} \quad (10)$$

$E_2^{sub\_oddline}: 8 \times 12$, $$E_2^{sub\_evenline} = \begin{bmatrix} 1 & 0 & 0 & 0 & 0 & 0 & 0 & 0 & 0 & 0 & 0 & 0 \\ 0 & -1 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & -1 & 0 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 1 \end{bmatrix} \quad (11)$$

$E_2^{sub\_evenline}: 8 \times 12$

The YC addition unit ($E_3$) 716 performs an interleaving function for adding a luminance signal and a chrominance signal. The interleaving process is defined in equation 12 below:

$$x_{CVBS} = E_3 x_{YC}, \quad (12)$$

$$\begin{bmatrix} Y_0 + C_0 \\ \vdots \\ Y_{MN-1} + C_{MN-1} \end{bmatrix} = \begin{bmatrix} E_3^{sub} & O_{2\times 4} & \cdots & O_{2\times 4} \\ O_{2\times 4} & \ddots & & \vdots \\ \vdots & & \ddots & O_{2\times 4} \\ O_{2\times 4} & \cdots & O_{2\times 4} & E_3^{sub} \end{bmatrix} \begin{bmatrix} Y_0 \\ C_0 \\ \vdots \\ Y_{MN-1} \\ C_{MN-1} \end{bmatrix}$$

where submatrix $E_3^{sub}$ is defined in equation 13 below:

$$E_3^{sub} = \begin{bmatrix} 1 & 1 & 0 & 0 \\ 0 & 0 & 1 & 1 \end{bmatrix}, \quad E_3^{sub}: 2 \times 4 \quad (13)$$

Figure 8B:
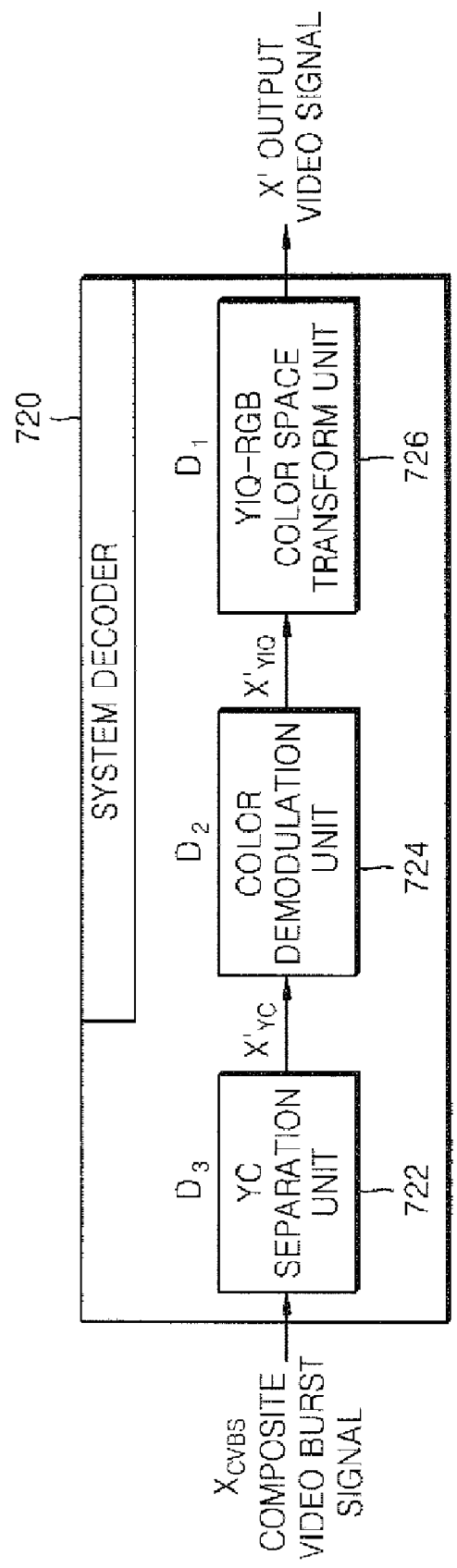
FIG. 8B is a block diagram illustrating a structure of a decoder according to an exemplary embodiment of the present invention.

FIG. 8B is a block diagram illustrating a structure of a decoder according to an exemplary embodiment of the present invention. Referring to FIG. 8B, the system decoder 720 is composed of a YC separation unit 722, a color demodulation unit 724, and a YIQ-RGB color space transform unit 726.

The YC separation unit ($D_3$) 722 separates an input signal into a luminance signal and a chrominance signal, by using a YC separation filter, and the shape of the YC separation unit ($D_3$) 7 varies depending on the type of a YC separation filter. When the YC separation filter is a low pass filter (LPF), the separation process is defined in equation 14 below:

$$x'_{YC} = D_{3,L} x_{CVBS}, \quad D_{3,L}: [LPF] \quad (14)$$

$$\begin{bmatrix} o_{4\times 1} \\ Y'_4 \\ C'_4 \\ \vdots \\ Y'_{MN-5} \\ C'_{MN-5} \\ o_{4\times 1} \end{bmatrix} = \begin{bmatrix} d_4 & d_5 & \cdots & d_{MN-1} & d_0 & \cdots & d_3 \\ d_3 & d_4 & \cdots & d_{MN-2} & d_{MN-1} & \cdots & d_2 \\ \vdots & \vdots & \cdots & \vdots & \vdots & \cdots & \vdots \\ d_5 & d_6 & \cdots & d_0 & d_1 & \cdots & d_4 \end{bmatrix} \begin{bmatrix} Y_0 + C_0 \\ \vdots \\ Y_{MN-1} + C_{MN-1} \end{bmatrix}$$

where vector $d_i$ (i=0, 1, ..., MN−1) forming $D_3$ is defined in equation 15 below:

$$d_0 = \begin{bmatrix} -0.0489 \\ 0.0489 \end{bmatrix} = d_8, \quad (15)$$

$$d_1 = \begin{bmatrix} -0.0654 \\ 0.0654 \end{bmatrix} = d_7,$$

$$d_2 = \begin{bmatrix} 0.0751 \\ -0.0751 \end{bmatrix} = d_6,$$

$$d_3 = \begin{bmatrix} 0.3180 \\ -0.3180 \end{bmatrix} = d_5,$$

$$d_4 = \begin{bmatrix} 0.4423 \\ 1 - 0.4423 \end{bmatrix},$$

$$d_9 = \begin{bmatrix} 0 \\ 0 \end{bmatrix} = d_{10} = \cdots = d_{MN-1}$$

In this case, the coefficients are those used when a 9-tap low pass filter with a cutoff frequency of 3 MHz is used. With respect to other embodiments, other filters, such as 1H comb filter and 2H comb filter, can be employed selectively as the YC separation filter, and according to the filters, the coefficient values also vary.

The color demodulation unit ($D_2$) 724 separates a chrominance signal into an in-phase signal and an orthogonal-phase signal, and the separation process is defined in equation 16 below:

$$x'_{YIQ} = D_2 x'_{YC}, \quad (16)$$

$$D_2 = D_{2,L} D_{2,demo}$$

$$\begin{bmatrix} Y'_0 \\ I'_0 \\ Q'_0 \\ \vdots \\ Y'_{MN-1} \\ I'_{MN-1} \\ Q'_{MN-1} \end{bmatrix} =$$

$$D_{2,L} \begin{bmatrix} D_{2,demo}^{sub} & O_{6M\times 4M} & \cdots & O_{6M\times 4M} \\ O_{6M\times 4M} & \ddots & & \vdots \\ \vdots & & \ddots & O_{6M\times 4M} \\ O_{6M\times 4M} & \cdots & O_{6M\times 4M} & D_{2,demo}^{sub} \end{bmatrix} \begin{bmatrix} Y'_0 \\ C'_0 \\ \vdots \\ Y'_{MN-1} \\ C'_{MN-1} \end{bmatrix} =$$

$$D_{2,L} \begin{bmatrix} Y'_{0,demo} \\ I'_{0,demo} \\ Q'_{0,demo} \\ \vdots \\ Y'_{MN-1,demo} \\ I'_{MN-1,demo} \\ Q'_{MN-1,demo} \end{bmatrix}$$

Here, $D_{2,demo}^{sub}$ as an inverse process of $E_2^{sub}$ is defined in equation 17 below:

$$D_{2,demo}^{sub} = \begin{bmatrix} D_{2,demo}^{sub\_odd} & O_{3M \times 2M} \\ O_{3M \times 2M} & D_{2,demo}^{sub\_even} \end{bmatrix}, \quad D_{2,demo}^{sub}: 6M \times 4M \quad (17)$$

Here, submatrices $D_{2,demo}^{sub\_odd}$ and $D_{2,demo}^{sub\_even}$ are defined in equations 18 and 19 below, respectively:

$$D_{2,demo}^{sub\_odd} = \begin{bmatrix} D_{2,demo}^{sub\_oddline} & O_{12 \times 8} & \cdots & O_{12 \times 8} \\ O_{12 \times 8} & \ddots & & \vdots \\ \vdots & & \ddots & O_{12 \times 8} \\ O_{12 \times 8} & \cdots & O_{12 \times 8} & D_{2,demo}^{sub\_oddline} \end{bmatrix}, \quad (18)$$

$$D_{2,demo}^{sub\_oddline}: 3M \times 2M,$$

$$D_{2,demo}^{sub\_even} = \begin{bmatrix} D_{2,demo}^{sub\_evenline} & O_{12 \times 8} & \cdots & O_{12 \times 8} \\ O_{12 \times 8} & \ddots & & \vdots \\ \vdots & & \ddots & O_{12 \times 8} \\ O_{12 \times 8} & \cdots & O_{12 \times 8} & D_{2,demo}^{sub\_evenline} \end{bmatrix}, \quad (19)$$

$$D_{2,demo}^{sub\_evenline}: 3M \times 2M$$

Also, $D_{2,demo}^{sub\_oddline}$ and $D_{2,demo}^{sub\_evenline}$ are defined in equation 20 below:

$$D_{2,demo}^{sub\_oddline} = \begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & -1 & 0 & 0 \\ 0 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 0 \\ 0 & 0 & 0 & 0 & 0 & 0 & 0 & -1 \end{bmatrix}, \quad (20)$$

$$D_{2,demo}^{sub\_evenline} = \begin{bmatrix} 1 & 0 & 0 & 0 & 0 & 0 & 0 & 0 \\ 0 & -1 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 0 & 0 & -1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 0 \\ 0 & 0 & 0 & 0 & 0 & 0 & 0 & 1 \end{bmatrix}$$

$D_{2,demo}^{sub\_oddline}, D_{2,demo}^{sub\_evenline}: 12 \times 8$ $D_{2,L}$ performing low pass filtering of an in-phase signal and an orthogonal-phase signal is defined in equation 21 below:

$$\begin{bmatrix} o_{4 \times 1} \\ Y'_0 \\ I'_0 \\ Q'_0 \\ \vdots \\ Y'_{MN-1} \\ I'_{MN-1} \\ Q'_{MN-1} \\ o_{4 \times 1} \end{bmatrix} = D_{2,L} \begin{bmatrix} Y'_{0,demo} \\ I'_{0,demo} \\ Q'_{0,demo} \\ \vdots \\ Y'_{MN-1,demo} \\ I'_{MN-1,demo} \\ Q'_{MN-1,demo} \end{bmatrix} \quad (21)$$

$$= \begin{bmatrix} D_4 & D_5 & \cdots & D_{MN-1} & D_0 & \cdots & D_3 \\ D_3 & D_4 & \cdots & D_{MN-2} & D_{MN-1} & \cdots & D_2 \\ \vdots & \vdots & \cdots & \vdots & \vdots & \cdots & \vdots \\ D_5 & D_6 & \cdots & D_0 & D_1 & \cdots & D_4 \end{bmatrix} \begin{bmatrix} Y'_{0,demo} \\ I'_{0,demo} \\ Q'_{0,demo} \\ \vdots \\ Y'_{MN-1,demo} \\ I'_{MN-1,demo} \\ Q'_{MN-1,demo} \end{bmatrix}$$

Vector $D_i$ (i=0, 1, ..., MN−1) forming $D_{2,L}$ is defined in equation 22 below:

$$D_0 = \begin{bmatrix} 0 & 0 & 0 \\ 0 & 0.0245 & 0 \\ 0 & 0 & 0.0807 \end{bmatrix} = D_8, \quad (22)$$

$$D_1 = \begin{bmatrix} 0 & 0 & 0 \\ 0 & 0.0732 & 0 \\ 0 & 0 & 0.1017 \end{bmatrix} = D_7,$$

$$D_2 = \begin{bmatrix} 0 & 0 & 0 \\ 0 & 0.1298 & 0 \\ 0 & 0 & 0.1192 \end{bmatrix} = D_6,$$

-continued $$D_3 = \begin{bmatrix} 0 & 0 & 0 \\ 0 & 0.1758 & 0 \\ 0 & 0 & 0.1309 \end{bmatrix} = D_5,$$

$$D_4 = \begin{bmatrix} 1 & 0 & 0 \\ 0 & 0.1934 & 0 \\ 0 & 0 & 0.1350 \end{bmatrix},$$

$$D_9 = O_{3 \times 3} = D_{10} = \cdots = D_{MN-1}$$

The YIQ-RGB space transform unit ($D_1$) 726 transforms a YIQ signal into an RGB signal and outputs an output image signal, and this transform process is defined in equation 23 below:

$$D_1 \begin{bmatrix} R'_0 \\ G'_0 \\ B'_0 \\ \vdots \\ R'_{MN-1} \\ G'_{MN-1} \\ B'_{MN-1} \end{bmatrix} = \begin{bmatrix} D_1^{sub} & O_{3 \times 3} & \cdots & O_{3 \times 3} \\ O_{3 \times 3} & \ddots & & \vdots \\ \vdots & & \ddots & O_{3 \times 3} \\ O_{3 \times 3} & \cdots & O_{3 \times 3} & D_1^{sub} \end{bmatrix} \begin{bmatrix} Y'_0 \\ I'_0 \\ Q'_0 \\ \vdots \\ Y'_{MN-1} \\ I'_{MN-1} \\ Q'_{MN-1} \end{bmatrix} \quad (23)$$

Submatrix $D_1^{sub}$ is defined in equation 24 below:

$$D_1^{sub} = \begin{bmatrix} 1 & 0.956 & 0.620 \\ 1 & -0.272 & -0.647 \\ 1 & -1.108 & 1.7 \end{bmatrix}, D_1^{sub}: 3 \times 3 \quad (24)$$

As described above, in the process of encoding and decoding using the system encoder 710 and the system decoder 720, artifacts occur in the composite video burst signal. Also, even in the signal decoded through the preprocessing process as illustrated in FIG. 3, some artifacts remain. A process of removing the artifacts that occur in the process will now be explained.

The encoder prediction unit 732 performs a function for restoring the composite video burst signal $X_{CVBS}$ from the output video signal X' before the decoding is performed. The value obtained through the encoder prediction unit 732 is a predicted value X'$_{CVBS}$ that is close to the composite video burst signal.

The decoder prediction unit 734 decodes the encoded predicted value, X'$_{CBS}$, by using a YC separation filter of a type different from that of the YC separation filter used in the system decoder 720. By doing so, the decoder prediction unit 734 outputs a predicted value, x̃, in which artifacts not removed in the system decoder 720 are removed.

For example, if a 2H comb filter is used as a YC separation filter in the system decoder 720, artifacts in the length direction are removed but artifacts in the width direction are generated. Here, if a 3H comb filter is used as a YC separation filter in the decoder prediction unit 734, the 3H comb filter has a function for removing artifacts in the width direction and thus removes the artifacts in the width direction generated through the 2H comb filter and the already-existing original artifacts in the width direction.

Figure 9:
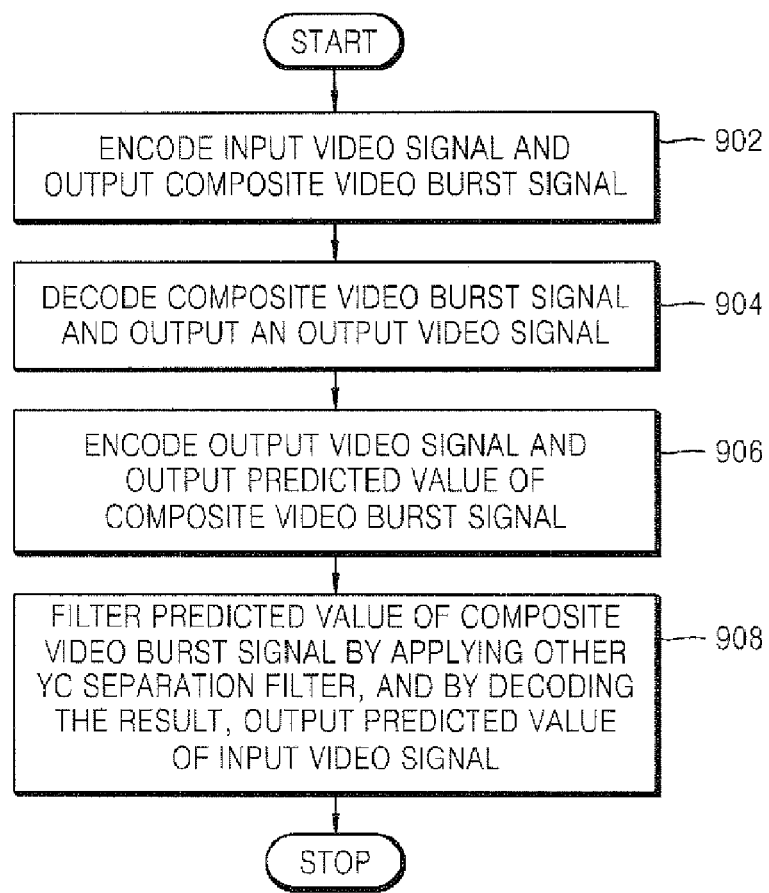
FIG. 9 is a flowchart illustrating a method of detecting and removing artifacts according to an exemplary embodiment of the present invention.

FIG. 9 is a flowchart illustrating a method of detecting and removing artifacts according to an exemplary embodiment of the present invention.

In operation 902, if an input video signal X is input, the input video signal X is encoded and a composite video burst signal $X_{CVBS}$ is output.

In operation 904, the composite video burst signal $X_{CVBS}$ is decoded and an output video signal X' is output.

In operation 906, the output video signal X' is encoded and a predicted value, X'$_{CVBS}$, of the composite video burst signal $X_{CVBS}$ is output.

In operation 908, the decoder prediction unit 734 filters and decodes the predicted value X'$_{CVBS}$ of the composite video burst signal $X_{CVBS}$, by applying a different YC separation filter, and outputs a predicted value, x̃, of the input video signal.

In the current exemplary embodiment, the artifact detection and removal unit 730 is connected to a back end of the system decoder unit 720, but it can also be connected to a front end of the system encoder unit 710 so that artifacts can be removed through the process described above.

Figure 10:
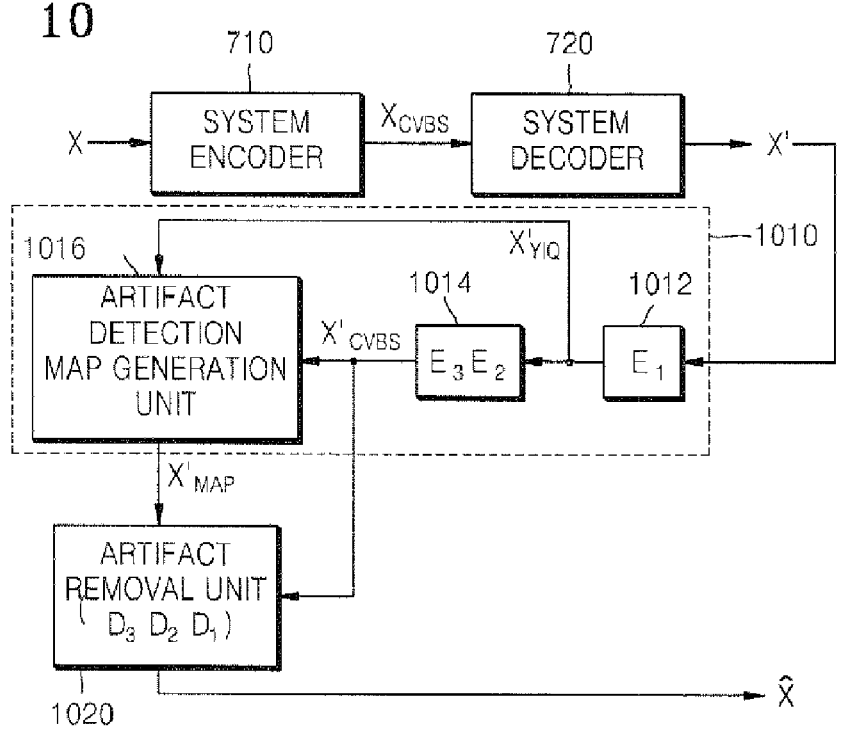
FIG. 10 is a block diagram illustrating a structure of an apparatus for detecting and removing artifacts according to another exemplary embodiment of the present invention.

FIG. 10 is a block diagram illustrating a structure of an apparatus for detecting and removing artifacts according to another exemplary embodiment of the present invention. Referring to FIG. 10, the apparatus for detecting and removing artifacts is composed of an artifact detection unit 1010 and an artifact removal unit 1020. For convenience of explanation, the system encoder 710 and the system decoder 720 of FIG. 2 are also illustrated. Also, the apparatus for detecting and removing artifacts of the current exemplary embodiment can be applied to the artifact detection and removal unit 330 of FIG. 3.

The artifact detection unit 1010 is composed of an RGB-YIQ color space transform unit ($E_1$) 1012, a color modulation unit $E_2$) and YC addition unit ($E_3$) 1014, and an artifact detection map generation unit 1016.

The RGB-YIQ color space transform unit ($E_1$) 1012 transforms the output video signal X' into X'$_{YIQ}$ formed with a luminance signal, an in-phase signal and an orthogonal signal.

The color modulation unit ($E_2$) and YC addition unit ($E_3$) 1014 synthesizes the in-phase signal and the orthogonal-phase signal into a chrominance signal, and synthesizes the chrominance signal and the luminance signal into a composite video burst signal X'$_{CBS}$, respectively.

The artifact detection map generation unit 1016 detects artifacts by comparing the luminance signals of X'$_{YIQ}$ and X'$_{CVBS}$, and generates an artifact detection map X'$_{MAP}$ using equation 25 below:

$$(x'_{MAP})_k = \begin{cases} 1, & |(L(x'_{CVBS}))_k - (x'_Y)_k| > Th_{MAP} \\ 0, & \text{otherwise} \end{cases}, k = 0, 1, \ldots, MN-1 \quad (25)$$

where $L(.)$ is a low pass filter, and a 1 MHz 9-tap low pass filter is used. Also, $x'_y = [Y'_0 Y'_1 \ldots Y'_{MN-1}]$ is a vector formed with only Y components in X'$_{YIQ}$ and Th$_{MAP}$ is a threshold for detecting artifacts.

However, the cutoff frequency and the number of taps are not limited to 1 MHz and 9 taps, and other values can be applied selectively in other embodiments.

The artifact removal unit ($D_3D_2D_1$) 1020 is composed of a YC separation unit ($D_3$), a color demodulation unit ($D_2$) and a YIQ-RGB color space transform unit ($D_1$).

The artifact removal unit ($D_3D_2D_1$) 1020 filters and decodes an artifact detection area according to an artifact detection map and outputs a signal x̃ from which artifacts have been removed.

Thus, if filtering is performed only for the artifact detection area, it gives an advantage that artifacts occurring in a decoding process do not occur in an area where no artifacts occurred.

The YC separation filter uses a filter different from the YC separation filter used in a system decoder. A vector $\hat{d}_3$ forming the YC separation filter (D3) in a decoder prediction unit is defined in equation 26 below:

$$(\hat{d}_3)_k = \begin{cases} (\hat{d}_{3,1})_k, & \text{if } (x'_{MAP})_k = 1 \\ (\hat{d}_{3,2})_k, & \text{otherwise} \end{cases}, k = 0, 1, \ldots, MN - 1 \quad (26)$$

where $\hat{d}_{3,l}$ (l=1,2) is defined in equation 27 below:

$$(\hat{d}_{3,l})_k = \frac{(x'_Y)_k}{(x'_{CVBS})_k}, k = 0, 1, \ldots, MN - 1, l = 1, 2 \quad (27)$$

In the case of $\hat{d}_{3,l}$, $X'_Y$ is Y obtained using a 2H comb filter in the decoder prediction unit of FIG. 7.

Figure 11:
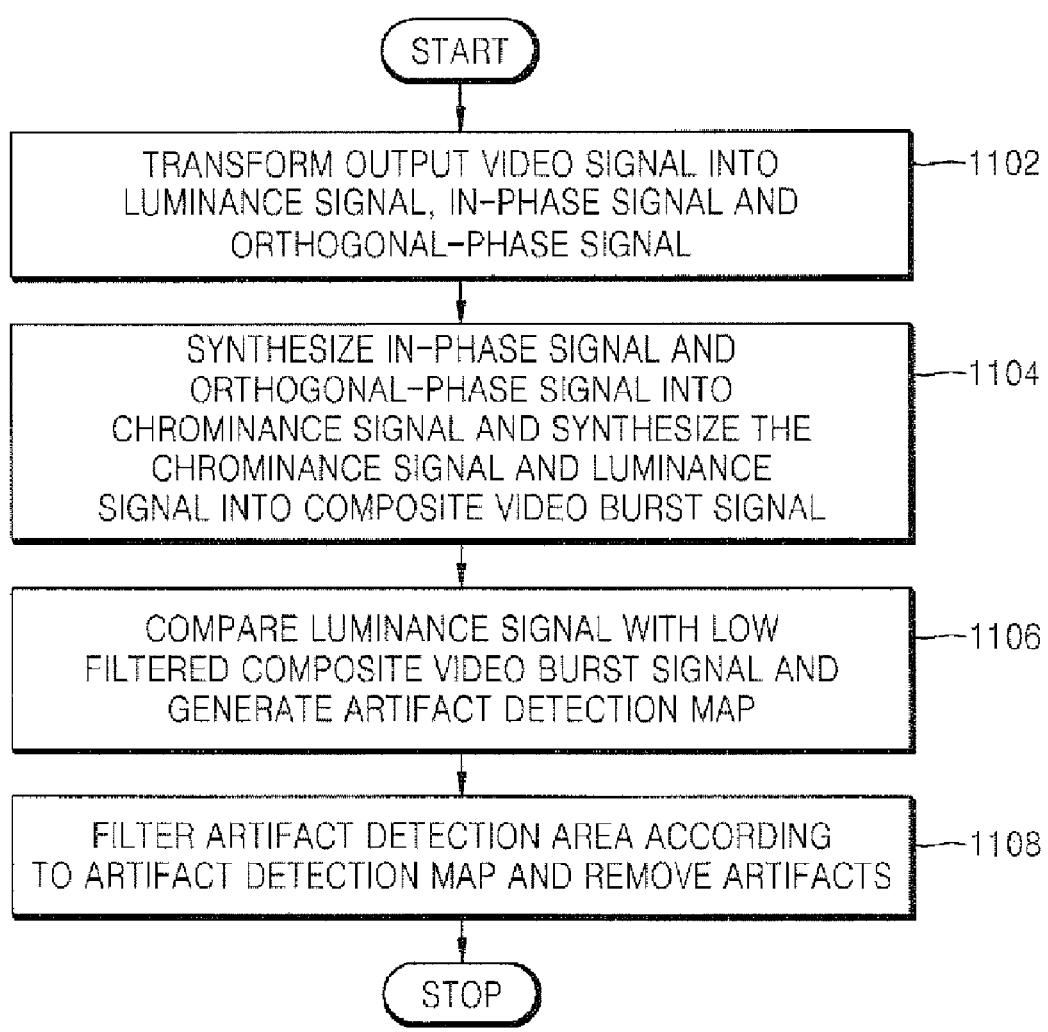
FIG. 11 is a flowchart illustrating a method of detecting and removing artifacts according to another exemplary embodiment of the present invention.

FIG. 11 is a flowchart illustrating a method of detecting and removing artifacts according to another exemplary embodiment of the present invention.

A process of inputting the input video signal X and outputting the output video signal X' in FIG. 11 is the similar to operations 902 and 904, and thus, an explanation will be omitted here.

In operation 1102, the output video signal X' is transformed into a luminance signal, an in-phase signal and an orthogonal-phase signal.

In operation 1104, the in-phase signal and the orthogonal-phase signal are synthesized into a chrominance signal and the chrominance signal and the luminance signal are synthesized into composite video burst signal X'$_{CVBS}$.

In operation 1106, the luminance signal and a signal obtained by filtering the composite video burst signal X'$_{CVBS}$ are compared and an artifact detection map is generated.

In operation 1108, artifacts are removed by filtering the artifact detection area according to the artifact detection map.

Though the artifact detection unit 1010 and the artifact removal unit 1020 are connected to the back end of the system decoder unit 720 in the current exemplary embodiment, they can be connected to the front end of the system decoder unit 720 so that artifacts can be removed through the process described above.

Figure 12:
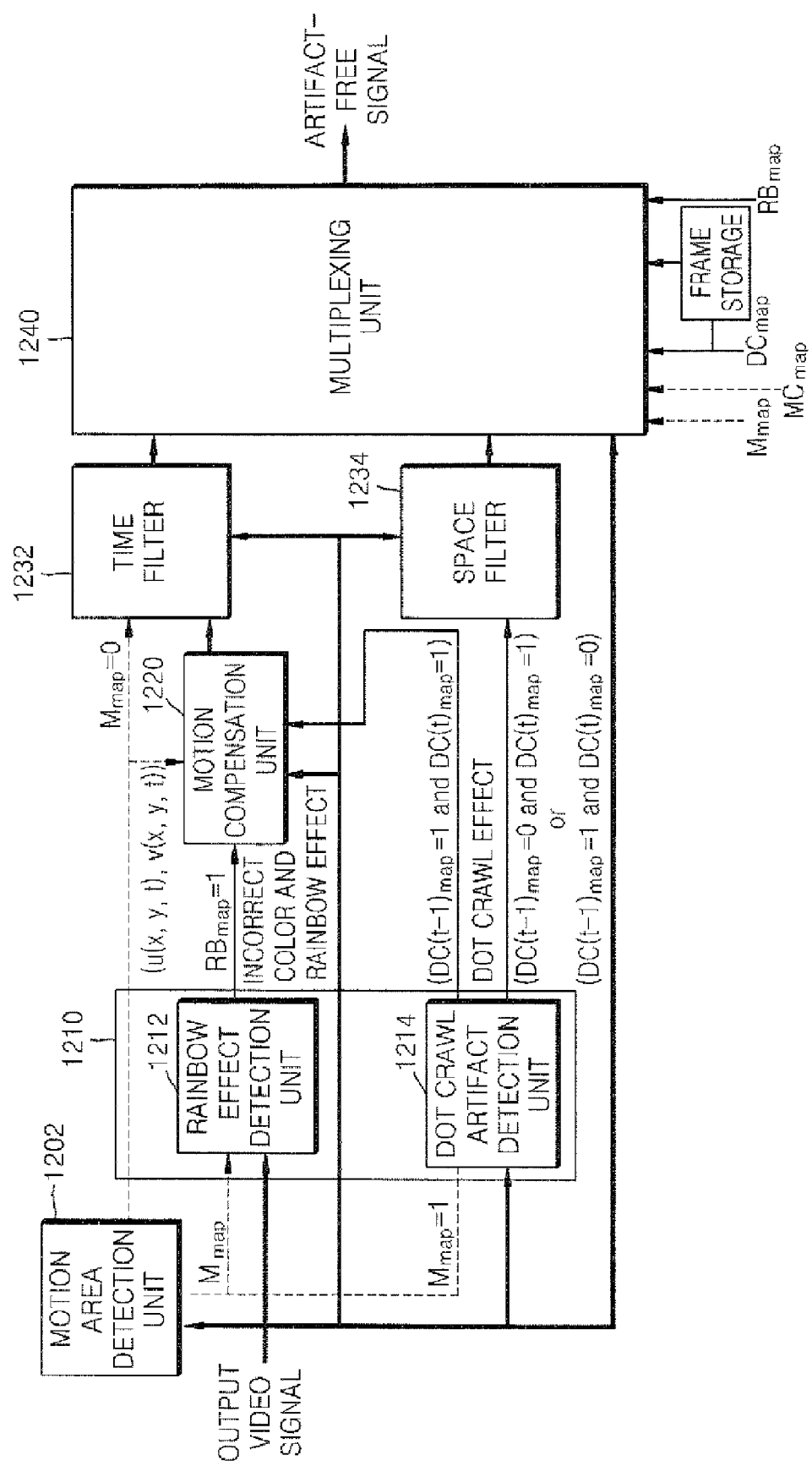
FIG. 12 is a block diagram illustrating a structure of an apparatus for detecting and removing artifacts according to still another exemplary embodiment of the present invention.

FIG. 12 is a block diagram illustrating a structure of an apparatus for detecting and removing artifacts according to still another exemplary embodiment of the present invention. In the current exemplary embodiment, unlike the exemplary embodiments of FIGS. 7 and 10, it is determined whether an area where an artifact occurs is a motion area and the type of artifact that occurs. Then, according to the determination result, a time filter and a space filter are applied appropriately to the determination result so that the artifact can be removed.

Referring to FIG. 12, the apparatus for detecting and removing artifacts according to the current exemplary embodiment is composed of a motion area detection unit 1202, an artifact detection unit 1210, a motion compensation unit 1220, a time filter 1232, a space filter 1234, and a multiplexing unit 1240.

If an output video signal is input, the motion area detection unit 1202 generates a motion detection map M$_{map}$ and a motion compensation map MC$_{map}$ by using motion information between two neighboring frames in the output video signal.

The artifact detection unit 1210 is composed of a rainbow effect detection unit 1212 and a dot crawl artifact detection unit 1214.

The rainbow effect detection unit 1212 detects a rainbow effect and generates a rainbow effect detection map, RB$_{map}$. The rainbow effect is an artifact in which when an image moves fast, a luminance signal remains in a chrominance signal and thus rainbow colors are seen in an area where a big difference of brightness occurs.

The dot crawl artifact detection unit 1214 detects a dot crawl artifact and generates a dot crawl artifact detection map, DC$_{map}$. The dot crawl artifact is an artifact in which a chrominance signal remains in a luminance signal and thus a dot crawl occurs.

The motion compensation unit 1220 compensates for a motion when an area having an artifact is moved, so that the artifact can be removed through time filtering.

The time filter 1232 removes artifacts in an area where no motion exists. Also, in the case of an area where motion exists, if the motion compensation unit 1220 compensates for motion according to a motion compensation map MC$_{map}$, the time filter 1232 filters the motion compensated image and thus removes the artifact.

When dot crawl artifact detection maps of two frames do not match, the space filter 1234 is used to remove the artifacts.

According to control signals of the motion detection map M$_{map}$, and the motion compensation map MC$_{map}$ in relation to an area in which artifacts occur, and a dot crawl artifact detection map DC$_{map}^{(x,y,t)}$ in a current frame, a dot crawl artifact detection map DC$_{map}^{(x,y,t-1)}$ in the previous frame, and a rainbow effect detection map RB$_{map}$, the multiplexing unit 1240 performs filtering by combining the time filter 1232 and the space filter 1234 so that an artifact-free signal can be output.

Figure 13:
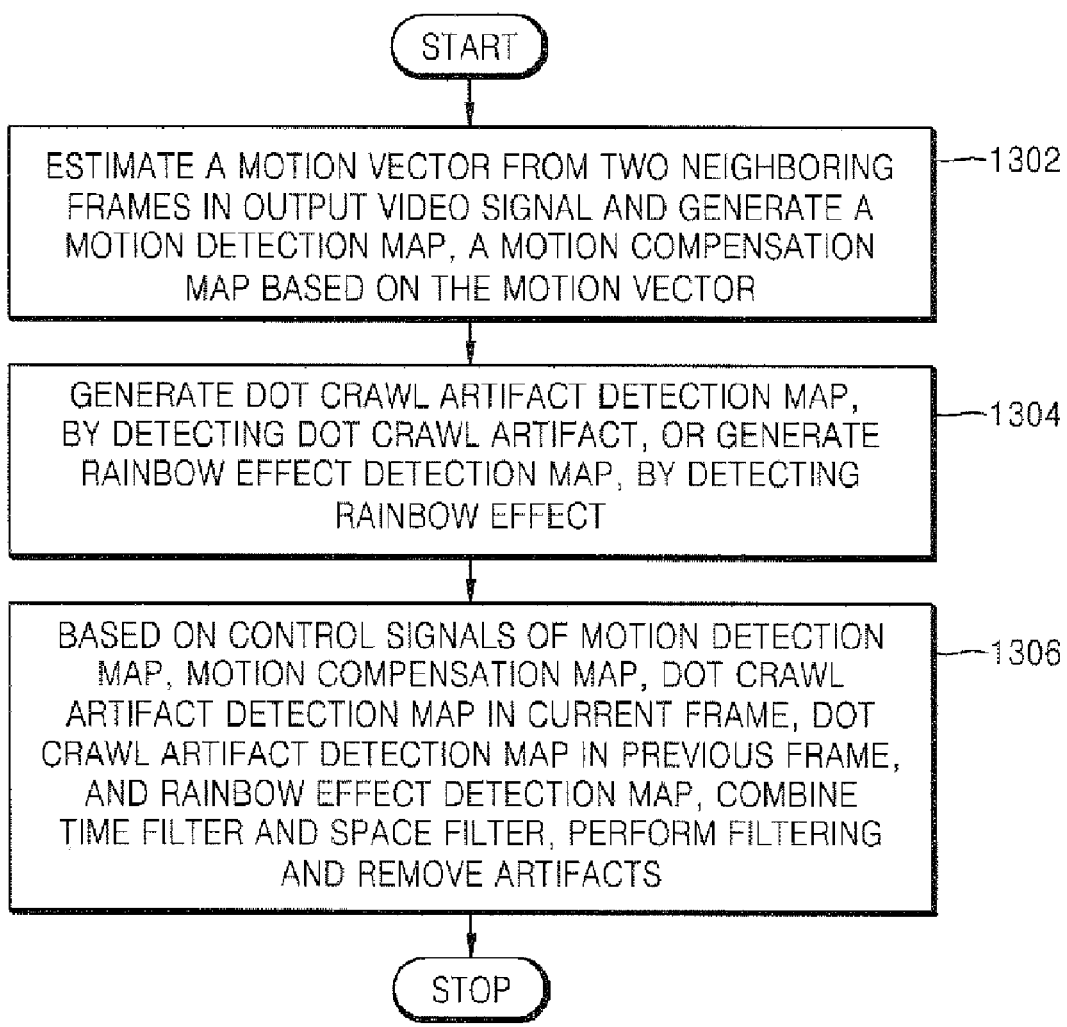
FIG. 13 is a flowchart illustrating a method of detecting and removing artifacts according to still another exemplary embodiment of the present invention.

FIG. 13 is a flowchart illustrating a method of detecting and removing artifacts according to still another exemplary embodiment of the present invention.

In operation 1302, if a output video signal is input, estimate a motion vector from two neighboring frames in output video signal and generate a motion detection map M$_{map}$, a motion compensation map MC$_{map}$ based on the motion vector In operation 1304, a dot crawl artifact is detected and a dot crawl artifact detection map DC$_{map}$ is generated. Also, a rainbow effect is detected and a rainbow effect detection map RB$_{map}$ is generated.

In operation 1306, according to control signals of the motion detection map M$_{map}$, and the motion compensation map MC$_{map}$ in relation to an area in which artifacts occur, and a dot crawl artifact detection map DC$_{map}^{(x,y,t)}$ in a current frame, a dot crawl artifact detection map DC$_{map}^{(x,y,t-1)}$ in the previous frame, and a rainbow effect detection map RB$_{map}$, by combining a time filter and a space filter, filtering is performed and an artifact-free signal is output.

Figure 14:
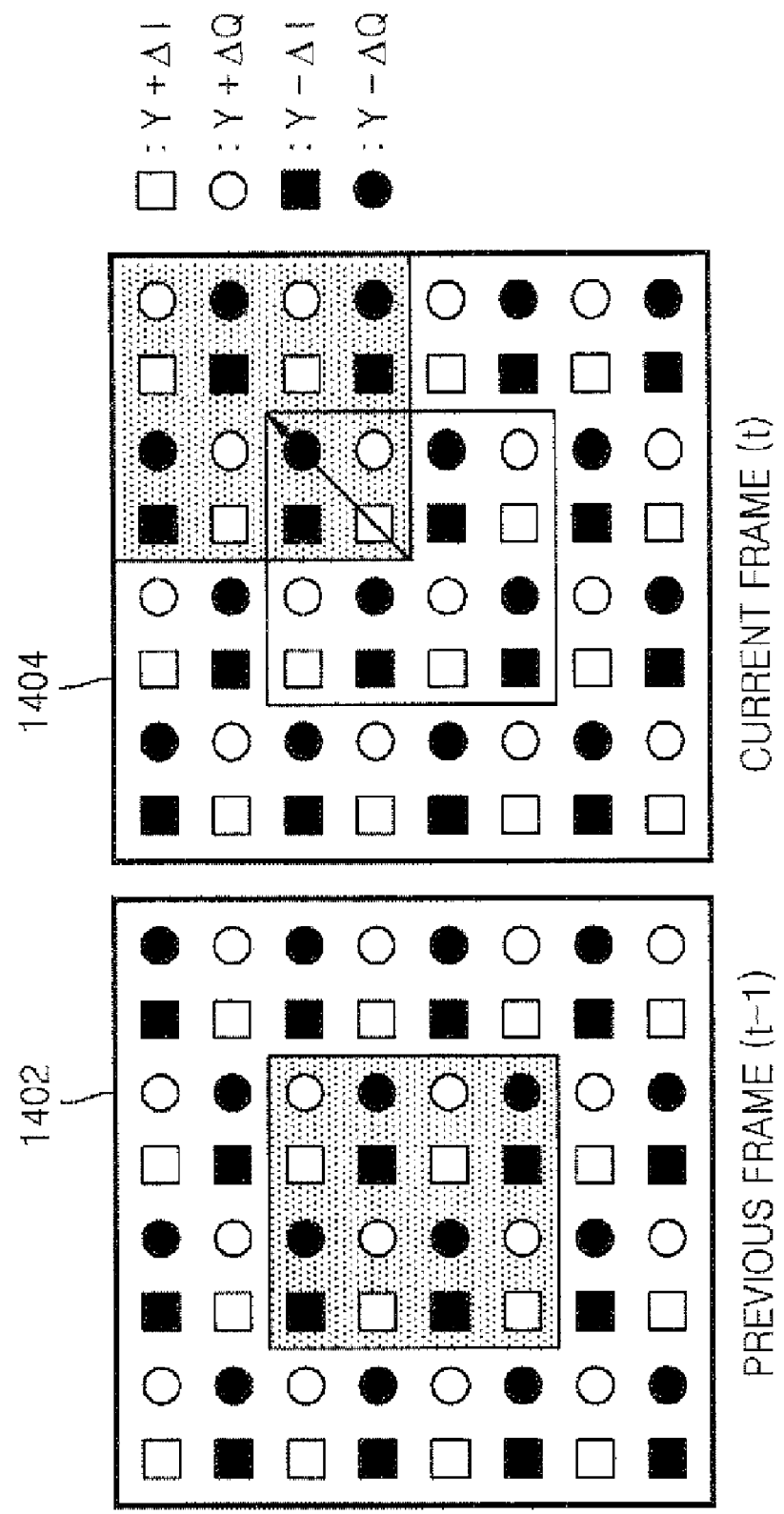
FIG. 14 is a diagram illustrating an operation used to detect a motion according to an exemplary embodiment of the present invention.

FIG. 14 is a diagram illustrating an operation used to detect a motion according to an exemplary embodiment of the present invention.

The motion area detection unit 1202 extracts motion information between two neighboring frames and divides the information into a motion area and a motionless area.

In order to use motion information, the motion area detection unit 1202 uses a block matching algorithm (BMA). The block matching algorithm estimates a motion, by using the bright value difference between a current frame block and the previous frame block. In the block matching method, the brightness values of blocks of each of a plurality of continuous frames are compared with the brightness value of the previous frame in order to estimate a motion vector. In the block matching algorithm, the current frame is divided into blocks, each having a small M×N size without overlapping between the blocks, and the brightness value in each block is compared. In a search range, an area having a smallest value of a mean absolute difference (MAD) or a mean square difference (MSD) value is searched for with respect to the position of each block in the current frame 1404. The position of the previous image thus found and a position displacement of the current image are defined as motion vectors.

In FIG. 14, the diagram 1402 on the left-hand side is the previous frame and the diagram 1404 on the right-hand side is the current frame. FIG. 14 illustrates that an in-phase signal and an orthogonal-phase signal remain in a luminance signal because YC separation is not performed correctly. Since the characteristic of a composite video burst signal is reflected in the output image of a decoder in the NTSC system, pixels of the decoded image are classified into 4 types, Y+ΔI, Y−ΔI, Y+ΔQ, Y−ΔQ, with respect to an in-phase signal and an orthogonal-phase signal.

Each of the in-phase signal and the orthogonal-phase signal has a characteristic that the signal is positioned at every second pixel, and in two contiguous frames, the phase of the signal is reversed. By using this characteristic, the motion area detection unit 1202 detects motion. Also, when filtering a signal by compensating for motion, a block is found using this characteristic. Then, by using the found block and a time filter, dot crawl artifacts and rainbow effects are removed.

In a search range of the block matching algorithm, while moving in units of 2 pixels in the X axis direction and 1 pixel in the Y axis direction, a block having a smallest displaced frame difference (DFD) is found to determine a motion vector. The DFD is defined in equation 28 below:

$$d(x,y;t)=F_y(x,y;t)-F_y(x-u,y-v;t-1) \quad (28)$$

where x is an abscissa, y is an ordinate in the image, and u and v are values indicating amounts moved in the X direction and in the Y direction, respectively. Here, the motion vector is defined in equation 29 below:

$$(u(x,y,t), v(x,y,t)) = \arg\min_{(u',v') \in S} \left\{ \sum_{i=-bs/2}^{bs/2-1} \sum_{j=-bs/2}^{bs/2-1} |F_Y(x+i, y+j; t) - F_Y(x+i-u', y+j-v'; t-1)| \right\} \quad (29)$$

where bs is an even number and is a size of a block, and (i, j) are coordinates in the block and are found in the search range S. In the current exemplary embodiment, whether a motion exists is determined based on a motion vector. By determining whether motion exists, a motion detection map $M_{map}$ defined in equation 30 below can be generated:

$$M_{map}(x,y;t) = \begin{cases} 1, & (u(x,y,t), v(x,y,t)) > T_m \\ 0, & \text{otherwise} \end{cases} \quad (30)$$

where $T_m$ is a motion threshold, $M_{map}=0$ indicates a motionless area and $M_{map}=1$ is an area containing motion. Artifacts can occur both in a motion area and a motionless area. In these cases, filters suitable for respective areas are selected and the artifacts are removed. The effect of noise is reduced when a motion is searched according to the block matching algorithm compared to when a motion is searched in units of pixels.

A motion compensation map $MC_{map}$, which is another element forming motion information in addition to the motion detection map $M_{map}$, is defined in equation 31 below:

$$MC_{map}(x,y;t) = \begin{cases} 1, & d(x,y;t) < T_{mc} \\ 0, & \text{otherwise} \end{cases} \quad (31)$$

where $T_{mc}$ is a motion compensation filter threshold. When $MC_{map}=1$, a motion compensation filter is used and when $MC_{map}=0$, a motion compensation filter is not used.

Figure 15:
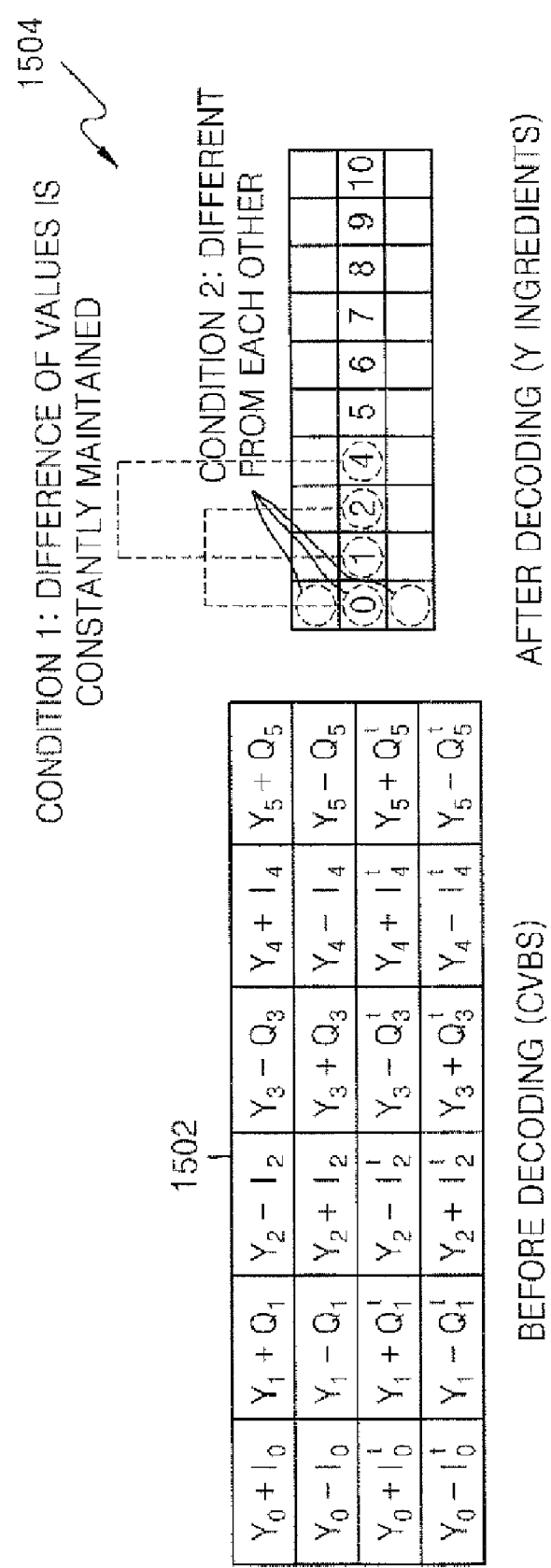
FIG. 15 is a diagram illustrating a method of detecting a dot crawl artifact according to an exemplary embodiment of the present invention.

FIG. 15 is a diagram illustrating a method of detecting a dot crawl artifact according to an exemplary embodiment of the present invention.

FIG. 15 illustrates a case where dot crawl artifacts occur in the vicinity of a horizontal color outline. The diagram 1502 on the left-hand side is a composite video burst signal that is a signal before decoding is performed. The composite video burst signal comprises a luminance signal, an in-phase signal and an orthogonal-phase signal. The diagram 1504 on the right-hand side is a luminance signal expressed in colors obtained by performing operations between neighboring lines in a 1H comb filter. After decoding, the signal is divided into a luminance signal, an in-phase signal, and an orthogonal signal, and the divided signals are output to frames, respectively. A dot crawl artifact occurs with each four pixels being one period, as illustrated in the right-hand diagram 1504, and the value of the dot crawl artifact is expressed in equation 32 below:

$$2Y+(I-I')2Y+(Q-Q'), 2Y+(-I+I'), 2Y+(-Q+Q') \quad (32)$$

where I and I' and Q and Q' indicate that the values of an orthogonal-phase signal and an in-phase signal between neighboring pixels are different. When I=I' or Q=Q', the output of a comb filter only has a Y component and thus a dot crawl artifact does not occur. However, if a color outline exists, a color component remains.

The color component remaining in the decoded luminance signal is expressed in equation 33 below:

$$|I-I'|=|-I+I'|$$

$$|Q-Q'|=|-Q+Q'| \quad (33)$$

The absolute values are the same as in equation 33 or the difference of the absolute values is small. By considering the characteristic of the dot crawl artifact, a dot crawl artifact detection map $DC_{map}$ is generated.

Two image frames having artifacts are input and a dot crawl pattern is searched for at a position where $M_{map}=1$ in a motion detection map $M_{map}$ generated previously by the motion area detection unit 1202. The dot crawl pattern is determined with respect to each of the two frames continuously input according to equation 34 below:

$$DC_{map}(x, y; t) = \qquad (34)$$

$$\begin{cases} 1, & |Y(x, y; t) - Y(x+2, y; t)| - |Y(x+2, y; t) - Y(x+4, y; t)| < T_{dc} \text{ and} \\ & |Y(x+1, y; t) - Y(x+3, y; t)| - |Y(x+3, y; t) - Y(x+5, y; t)| < T_{dc} \text{ and} \\ & Y(x, y; t) \neq Y(x, y-1; t) \neq Y(x, y+1; t) \\ 0, & \text{otherwise} \end{cases}$$

where $T_{dc}$ is a threshold suitable to detect a dot crawl artifact, $DC_{map}(x,y,t)$ is a dot crawl artifact detection map in the current frame and $DC_{map}(x,y,t-1)$ is a dot crawl artifact detection map in the previous frame.

The reason why detection of a dot crawl pattern is performed with respect to each frame is to efficiently remove dot crawl artifacts through an appropriate filter and to reduce a danger of occurrence of new artifacts.

Figure 16:
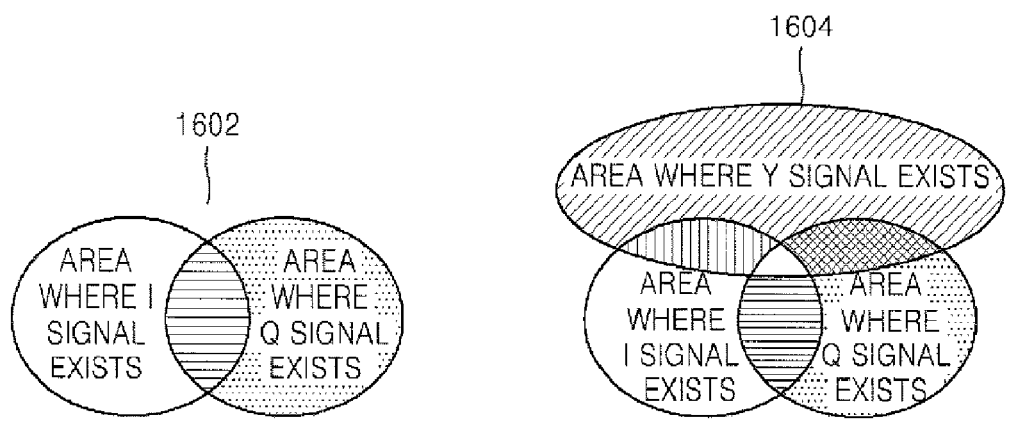
FIG. 16 is a diagram illustrating a method of detecting a rainbow effect according to an exemplary embodiment of the present invention.

FIG. 16 is a diagram illustrating a method of detecting a rainbow effect according to an exemplary embodiment of the present invention. The diagram 1602 on the left-hand side is a case where a rainbow effect does not occur and the diagram 1604 on the right-hand side is a case where a rainbow effect occurs. That is, unlike the diagram 1602 on the left-hand side, in the diagram 1604 on the right-hand side it can be seen that a luminance signal is mixed with an in-phase signal and an orthogonal-phase signal. In this case, a rainbow effect occurs. In order to detect this rainbow effect, by using the characteristic of a composite video burst signal that the values of color components in two neighboring frames are different from each other, an area in which the value of equation 35 below is in a threshold range is searched for:

$$d_I = |F_I(x,y;t) - F_I(x,y;t-1)|$$

$$d_Q = |F_Q(x,y;t) - F_Q(x,y;t-1)| \qquad (35)$$

If an area where a rainbow effect occurs is found according to the detection method, pixels in which the rainbow effect occurs are found according to equation 36 below:

$$RB_{map}(x, y; t) = \begin{cases} 1, & F_Y(x, y; t) > T_Y \text{ and } M_{map}(x, y; t) = 1 \\ & ((T_{I1} < |F_I(x, y; t-1) - F_I(x, y; t)| < T_{I2}) \text{ or} \\ & (T_{Q1} < |F_Q(x, y; t-1) - F_Q(x, y; t)| < T_{Q2})) \\ 0, & \text{otherwise} \end{cases} \qquad (36)$$

Figure 17:
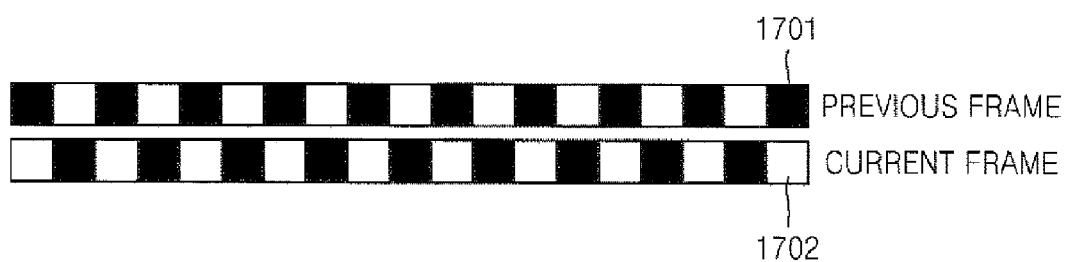
FIG. 17 is a diagram illustrating a time filter of FIG. 12 according to an exemplary embodiment of the present invention.

FIG. 17 is a diagram illustrating the time filter 1232 of FIG. 12 according to an exemplary embodiment of the present invention. FIG. 17 illustrates dot crawl patterns in neighboring frames, and a composite video burst signal has a characteristic that the phases of color signals in neighboring frames are opposite to each other. Referring to FIG. 17, the dot crawl patterns of the previous frame 1701 and the current frame 1702 show one pixel difference in the positions of the bright and dark dots. By using this characteristic, when no motion exists, simple time filtering is used, so that artifacts such as a dot crawl artifact and a rainbow effect can be removed through time filtering according to equation 37 below:

$$\hat{F}(x, y; t)_{stationary} = \frac{F(x, y; t) + F(x, y; t-1)}{2} \qquad (37)$$

where $\hat{F}(x,y;t)_{stationary}$ is a value filtered in a motionless area where no motion exists. In an area where a motion exists, a simple time filter cannot be used. However, when the characteristic of the NTSC artifacts is considered, a time filter can be used effectively, though in a limited scope. For example, if dot crawl artifact detection maps of the previous frame and the current frame are at identical positions, the dot crawl artifact can be removed through a simple time filtering method.

A dot crawl pattern and a rainbow effect occurring in an area where a motion exists cannot be removed through a simple time filter. In the case of the dot crawl pattern, due to the phase inverting characteristic of a composite video burst signal, the dot crawl pattern appears to blink in continuous frames. If in neighboring frames in which a rainbow effect occurs, the brightness values do not change and only movement of a position occurs between the frames, the rainbow effect can be removed through a time filter by compensating for a motion. When the motion is compensated for, the dot crawl artifact and rainbow effect are removed through a time filter according to equation 38 below:

$$\hat{F}(x, y; t)_{MC} = \frac{F(x, y; t) + F(x-u, y-v; t-1)}{2} \qquad (38)$$

where $\hat{F}(x,y;t)_{MC}$ is the brightness value of a frame which is time filtered for motion compensation, (x,y) is the position in the frame, and (x−u, y−v) is the motion-compensated position.

Figure 18:
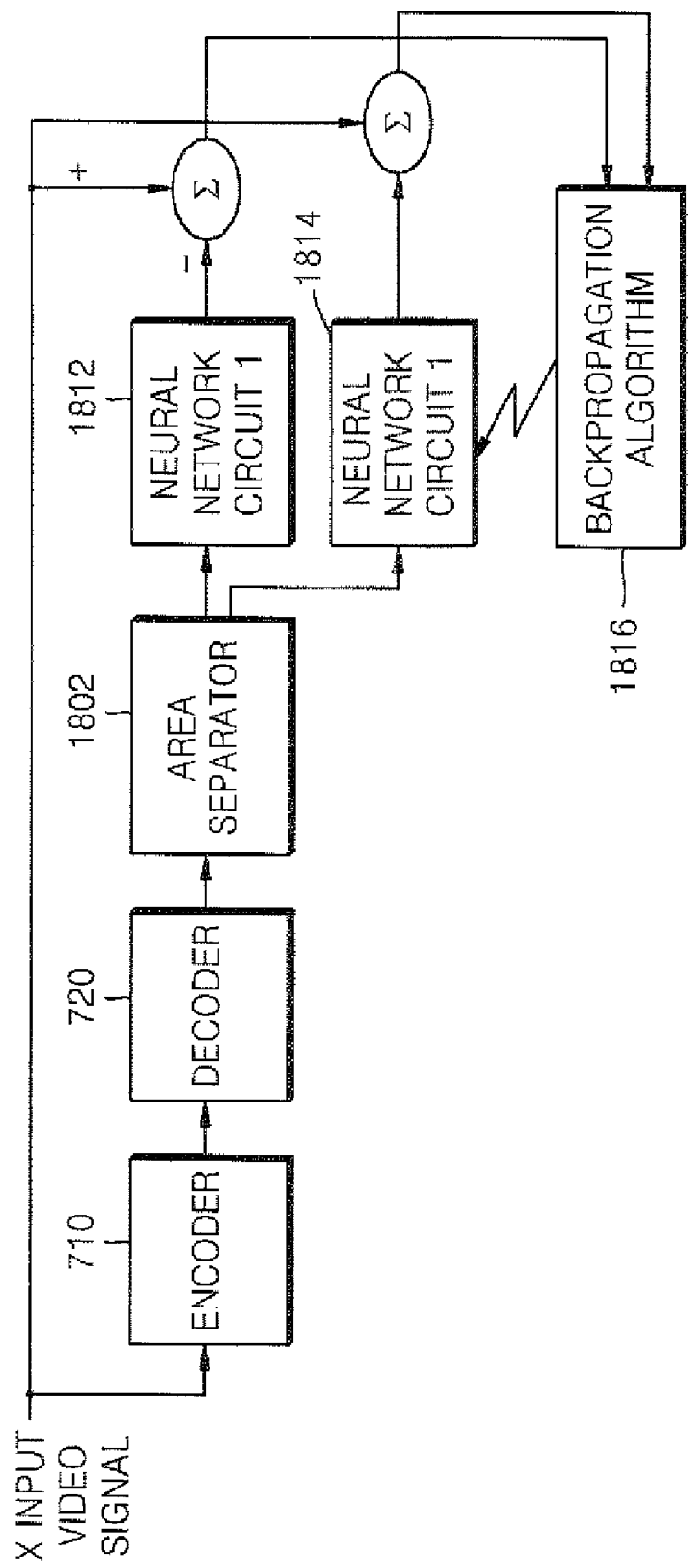
FIG. 18 is a diagram illustrating a space filter of FIG. 12 according to an exemplary embodiment of the present invention.

FIG. 18 is a diagram illustrating the space filter 1234 of FIG. 12 according to an exemplary embodiment of the present invention. FIG. 18 illustrates a neural network weight calculator for removing a dot crawl artifact. A space filter in the current exemplary embodiment removes a dot crawl artifact in units of pixels by using a neural network circuit. The weight (weighting coefficient) of a neural network circuit is obtained through training. If an input video signal passes through the system encoder 710 and the system decoder 720 of FIG. 7, it becomes a signal in which artifacts occur in the process of modulation and demodulation. The distorted image signal is divided through an area separator 1802 and the divided signals are input to respective neural network circuits.

The neural network circuits 1 and 2, 1812 and 1814, extract brightness values corresponding to an M×N size mask from a pixel in which an artifact is detected, extract brightness values at the same position in the original image, set the values as the input value and the target value, respectively, of the neural network circuits, and perform training.

In the current exemplary embodiment, a back propagation algorithm 1816 is used for training of a neural network circuit. According to the back propagation algorithm 1816, the weight of a neural network circuit is determined so that the difference of input values and target values, that is, errors, can be minimized.

Since neural network circuits 1 and 2 are trained using different types of training data, neural network circuits 1 and 2 have weights that are different from each other. Neural network circuit 1 has inputs of a dot crawl pattern in an area where motion exists and brightness values of adjacent pixels, and has a target value of the brightness value of a pixel at the same position in the original image. Training data of neural network circuit 2 has inputs of a dot crawl pattern in an area where no motion exists and brightness values of adjacent pixels, and has a target value of the brightness value of a pixel at the same position in the original image.

A neural network circuit is composed of an input layer having L nodes, a hidden layer having M nodes, and an output layer having N nodes. As inputs of each direction of a neural network circuit, pixels in a mask including L pixels centered at a pixel in which an artifact is detected, are extracted from an image, $I_f(m,n)$, in which an artifact exists at the same position that pixels are detected in, and used. As a target value, a value of a pixel centered in a mask is extracted from the same position which the pixel is located in the input video signal $I(m,n)$ and used.

The neural network circuit applies a weight suitable for the pixel at a position in which an artifact is detected by using a weight value obtained through training and direction information of the artifact, and removes artifacts in units of pixels. In a pixel-unit artifact removal block using the weight of the neural network circuit, output $I'_f(m,n)$, is calculated according to equation 39 below:

$$I'_f(m, n) = \begin{cases} \sum_{i=1}^{M} c_i^1 w_{i,1}^2(k) + b_i^2, & \text{if } B_f(x, y) = 1 \\ I_f(m, n), & \text{otherwise} \end{cases} \quad (39)$$

where $I_f(m,n)$ is an image in which artifacts exist, and $B_f(x,y)$ is a position where an artifact exists, and if $B_f(x,y)=1$, the pixel is a pixel in which an artifact is detected.

Also, intermediate process calculated value $C_i^1$ in the neural network circuit is calculated according to equation 40 below:

$$c_i^1 = \sum_{j=1}^{L} p_j w_{j,i}^1(k) + b_i^1 \quad (40)$$

where the superscript of $w^1_{j,i}(k)$, which indicates a weight, is the position of a layer; subscripts i and j indicate positions of nodes, respectively, at two continuous layers; and $b_t^1$ is a bias in which the superscript and subscript indicate the positions of the layer and the node, respectively.

The dot crawl artifacts and adjacent pixel values passing through each neural network circuit are output as weighted values close to the values in the original image. By training neural network circuits with a variety of images, and a variety of patterns of dot crawl artifacts, the neural network circuits are made to operate as filters adaptive to images of a variety of environments.

In another exemplary embodiment, when dot crawl detection maps of two frames do not match, a space filter can perform space filtering of the brightness value of one period according to equation 41 below, by using the characteristic that an artifact has a pattern repeating with a period of 4 pixels:

$$\hat{F}(x, y; t)_{spatial} = \frac{F(x-1, y; t) + F(x+1, y; t) + F(x, y-1; t) + F(x, y+1; t)}{4} \quad (41)$$

where $\hat{F}(x, y; t)_{spatial}$ is a brightness value obtained by space filtering a dot crawl artifact.

Figure 19:
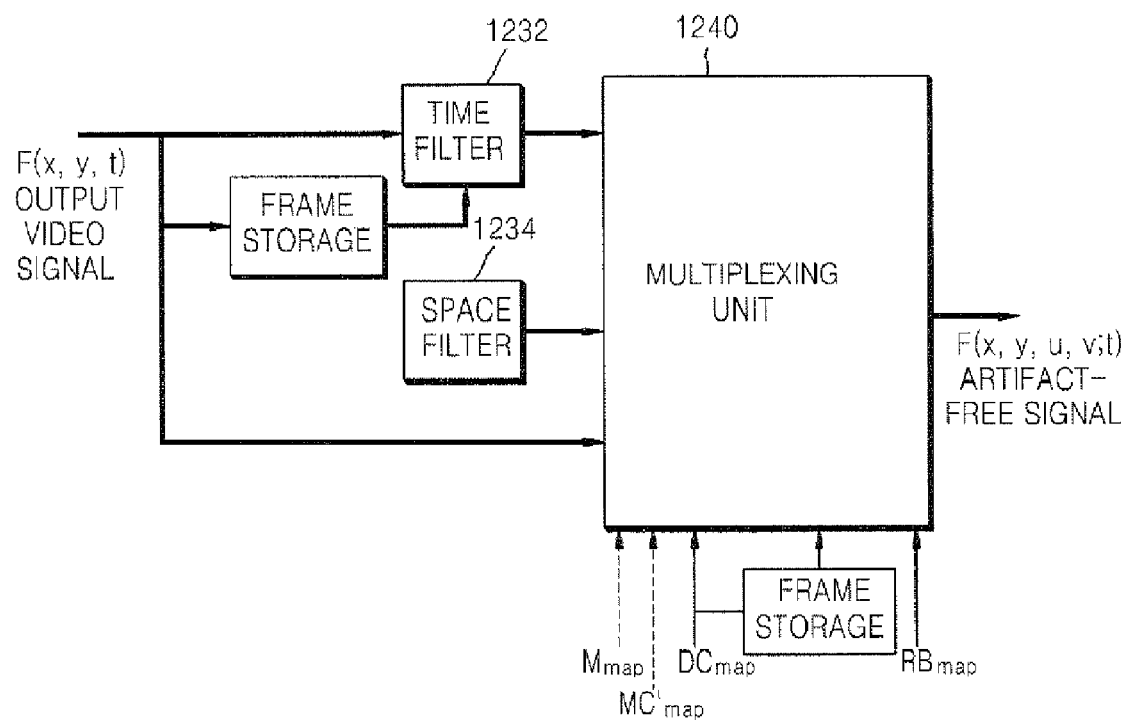
FIG. 19 is a diagram illustrating a multiplexing unit of FIG. 12 according to an exemplary embodiment of the present invention.

FIG. 19 is a diagram illustrating the multiplexing unit 1240 of FIG. 12 according to an exemplary embodiment of the present invention.

The multiplexing unit 1240 performs filtering by combining the time filter 1232 and the space filter 1234, using two neighboring frames as inputs and with reference to the control signals of a motion detection map $M_{map}$, and a motion compensation map $MC_{map}$, a dot crawl artifact detection map $DC_{map}^{(x,y,t)}$ in the current frame, a dot crawl artifact detection map $DC_{map}^{(x,y,t-1)}$ in the previous frame, and a rainbow effect detection map $RB_{map}$. The filter provided by the multiplexing unit 1240 is expressed as equation 42 below:

$$\hat{F}(x, y; t) = \begin{cases} \frac{F(x, y; t) + F(x, y; t-1)}{2}, & M_{map}(x, y; t) = 0 \\ \frac{F(x, y; t) + F(x-u, y-v; t-1)}{2}, & \begin{array}{l} M_{map}(x, y; t) = 1 \text{ and } MC_{map}(x, y; t) = 1 \\ ((DC_{map}(x, y; t) = 1 \text{ and } DC_{map}(x, y; t-1) = 1) \text{ or} \\ \text{and } RB_{map}(x, y; t) = 1) \end{array} \\ \frac{F(x-1, y; t) + F(x+1, y; t) + F(x, y-1; t) + F(x, y+1; t)}{4}, & \begin{array}{l} M_{map}(x, y; t) = 1 \text{ and} \\ ((DC_{map}(x, y; t-1) = 1 \text{ and } DC_{map}(x, y; t) = 0) \text{ or} \\ DC_{map}(x, y; t-1) = 0 \text{ and } DC_{map}(x, y; t) = 1)) \end{array} \\ F(x, y; t), & \text{otherwise} \end{cases} \quad (42)$$

where $\hat{F}(x,y;t)$ is an output value in which the artifact is removed through the filter.

FIG. 20 is a table illustrating the relations between control signals of the multiplexing unit and filters according to an exemplary embodiment of the present invention. Referring to FIG. 20, for example, in the case of the top line, the top line indicates that the area is a motionless area and thus no motion exists and $M_{map}=0$. Maps related to other artifacts are not required and in this case, a time filter is applied. In this way, a time filter or a space filter is applied according to respective control signals.

The systems to which the present invention is applied are not limited to the NTSC system and can also include a phase-alternating line (PAL) system and a Séquentiel couleur á mémoire (SECAM) system.

The present invention can also be embodied as computer readable codes on a computer readable recording medium.

The computer readable recording medium is any data storage device that can store data which can be thereafter read by a computer system. Examples of the computer readable recording medium include, but are not limited to, read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

According to the exemplary embodiment of the present invention as described above, filtering is performed before a decoding operation, and through the preprocessing process noise in relation to a 1D signal is removed. Then, by using a variety of methods of detecting and removing artefacts, artefacts are removed so that the picture quality of a composite video burst signal can be improved.

What is claimed is:

1. A method of improving picture quality in a composite video burst signal, the method comprising:
    dividing the composite video burst signal into a plurality of frequency bands using a low pass filter and a high pass filter;
    performing wavelet packet filtering of a frequency band including a chrominance signal having energy higher than a first threshold, among the plurality of frequency bands; and
    performing Wiener filtering of a frequency band including a chrominance signal having energy lower than a second threshold, among the plurality of frequency bands.

2. The method of claim 1, wherein the performing of the wavelet packet filtering comprises:
    dividing the composite video burst signal into a further plurality of frequency bands;
    generating wavelet transform coefficients by applying wavelet transforms to signals in the further plurality of frequency band; and
    removing a signal in a frequency band having a generated wavelet transform coefficient whose absolute value is less than a specified threshold.

3. The method of claim 1, wherein in the performing Wiener filtering, a size of a mask is varied with respect to a magnitude of a noise ratio.

4. The method of claim 1, further comprising:
    separating the divided composite video burst signal into a luminance signal and a chrominance signal;
    separating the chrominance signal into an in-phase signal and an orthogonal-phase signal; and
    transforming the luminance signal, the in-phase signal and the orthogonal-phase signal into a red (R) signal, a green (G) signal, and a blue (B) signal, respectively; and outputting an output video signal.

5. The method of claim 4, further comprising detecting and removing an artifact of the output video signal, wherein the detecting and removing of the artifact comprises:
    encoding the output video signal and outputting a predicted value of a composite video burst signal; and
    filtering the output predicted value of the composite video burst signal by using a luminance/chrominance (YC) separation filter of a type different from that of a YC separation filter for separating a luminance signal and a chrominance signal in a system decoder.

6. The method of claim 4, further comprising detecting and removing an artifact of the output video signal, wherein the detecting and removing the artifact comprises:
    transforming the output video signal into a luminance signal, an in-phase signal and an orthogonal-phase signal;
    synthesizing the in-phase signal and the orthogonal signal into a chrominance signal;
    synthesizing the luminance signal and the chrominance signal into a composite video burst signal;
    generating an artifact detection map indicating an area where an artifact occurs, by comparing the luminance signal and a signal obtained by low pass filtering the composite video burst signal; and
    filtering the area where the artifact is detected according to the artifact detection map, by using a YC separation filter of a type different from that of a YC separation filter for separating a luminance signal and a chrominance signal in a system decoder.

7. The method of claim 4, further comprising detecting and removing an artifact of the output video signal, wherein the detecting and removing the artifact comprises:
    estimating a motion vector from two neighboring frames in the output video signal;
    generating a motion detection map indicating whether motion exists between two neighboring frames and a motion compensation map indicating whether a motion compensation filter is used based on the motion vector;
    detecting a dot crawl artifact occurring in the vicinity of an outline of an image and generating a dot crawl artifact detection map, or detecting a rainbow effect in which rainbow colors are seen in an area where a difference of brightness occurs when an image moves fast, and generating a rainbow effect detection map;
    compensating for a motion according to the motion compensation map; and
    filtering an area where the artifact occurs by combining a time filter and a space filter based on control signals of the motion detection map, the motion compensation map, the dot crawl artifact detection map in a current frame, the dot crawl artifact detection map in a previous frame, and the rainbow effect detection map.

8. An apparatus for improving picture quality in a composite video burst signal, the apparatus comprising:
    a preprocessing filter which filters the composite video burst signal by using a wavelet packet filter and a Wiener filter;
    a luminance/chrominance (YC) separation unit which separates the filtered composite video burst signal into a luminance signal and a chrominance signal;
    a color demodulation unit which separates the chrominance signal into an in-phase signal and an orthogonal-phase signal; and
    a YIQ-RGB color space transform unit which transforms the luminance signal, in-phase signal and orthogonal-phase signal into a red (R) signal, a green (G) signal, and a blue (B) signal, respectively, and outputs an output video signal.

9. The apparatus of claim 8, further comprising an artifact detection and removal unit which detects and removes an artifact of the output video signal, wherein the artifact detection and removal unit comprises:
  an encoder prediction unit which encodes the output video signal and outputs a predicted value of a composite video burst signal; and
  a decoder prediction unit which decodes the output predicted value of the composite video burst signal and outputs a predicted value of an input video signal.

10. The apparatus of claim 9, wherein the decoder prediction unit comprises:
  a luminance/chrominance (YC) separation unit which performs filtering to separate the predicted value of the composite video burst signal into an in-phase signal and an orthogonal-phase signal, using a YC separation filter of a type different from that of a YC separation filter for separating a luminance signal and a chrominance signal in a system decoder;
  a color demodulation unit which separates the chrominance signal into an in-phase signal and an orthogonal-phase signal; and
  a YIQ-RGB color space transform unit which transforms the luminance signal, the in-phase signal and the orthogonal-phase signal into an R signal, a G signal, and a B signal, respectively, as a predicted value of the input video signal.

11. The apparatus of claim 8, further comprising an artifact detection and removal unit which detects and removes an artifact of the output video signal, wherein the artifact detection and removal unit comprises:
  an RGB-YIQ color space transform unit which transforms the output video signal into a luminance signal, an in-phase signal and an orthogonal-phase signal;
  a color modulation unit which synthesizes the in-phase signal and the orthogonal signal into a chrominance signal;
  a luminance/chrominance (YC) addition unit which synthesizes the luminance signal and the chrominance signal into a composite video burst signal;
  an artifact detection map generation unit which generates an artifact detection map indicating an area where an artifact occurs by comparing the luminance signal and a signal obtained by low pass filtering the composite video burst signal; and
  an artifact removal unit which removes artifacts by decoding the composite video burst signal according to the artifact detection map.

12. The apparatus of claim 11, wherein the artifact removal unit comprises:
  a luminance/chrominance (YC) separation unit which performs filtering to separate the area where the artifact is detected according to the artifact detection map into a luminance signal and a chrominance signal using a YC separation filter of a type different from that of a YC separation filter for separating a luminance signal and a chrominance signal in a system decoder;
  a color demodulation unit which separates the chrominance signal into an in-phase signal and an orthogonal-phase signal; and
  a YIQ-RGB color space transform unit which transforms the luminance signal, the in-phase signal and the orthogonal-phase signal into an R signal, a G signal, and a B signal, respectively, and outputs an artifact-free signal.

13. The apparatus of claim 8, further comprising an artifact detection and removal unit which detects and removes an artifact of the output video signal, wherein the artifact detection and removal unit comprises:
  a motion area detection unit which estimates a motion vector from two neighboring frames in the output video signal, generates a motion detection map indicating whether motion exists between two neighboring frames and a motion compensation map indicating whether a motion compensation filter is used based on the motion vector;
  an artifact detection unit which generates a dot crawl artifact detection map by detecting a dot crawl artifact occurring in the vicinity of an outline of an image, or generating a rainbow effect detection map by detecting a rainbow effect in which rainbow colors are seen in an area where a difference of brightness occurs when an image moves fast;
  a motion compensation unit which compensates for a motion according to the motion compensation map; and
  a multiplexing unit which filters an area where the artifact occurs, by combining a time filter and a space filter based on control signals of the motion detection map, the motion compensation map, the dot crawl artifact detection map in a current frame, the dot crawl artifact detection map in a previous frame, and the rainbow effect detection map.

14. A non-transitory computer readable recording medium having embodied thereon a computer program for executing the method of improving picture quality in a composite video burst signal of claim 1.

15. A non-transitory computer readable recording medium having embodied thereon a computer program for executing the method of improving picture quality in a composite video burst signal of claim 7.

* * * * *